Jan. 21, 1936.  A. F. PYM ET AL  2,028,351
MACHINE FOR SHAPING UPPERS OVER LASTS
Filed May 7, 1934  10 Sheets-Sheet 4

INVENTORS
Arthur F. Pym
William E. Scarlett
By their Attorney

Jan. 21, 1936.  A. F. PYM ET AL  2,028,351
MACHINE FOR SHAPING UPPERS OVER LASTS
Filed May 7, 1934  10 Sheets-Sheet 5

INVENTORS
Arthur F. Pym
William E. Scarlett
By their Attorney,
Harlow M. Davis

Patented Jan. 21, 1936

2,028,351

UNITED STATES PATENT OFFICE 2,028,351

MACHINE FOR SHAPING UPPERS OVER LASTS

Arthur F. Pym, Swampscott, and William E. Scarlett, Lynn, Mass., assignors to United Shoe Machinery Corporation, Paterson, N. J., a corporation of New Jersey Application May 7, 1934, Serial No. 724,278

62 Claims. (Cl. 12—7)

This invention relates to machines for operating on shoes, and is herein illustrated in its application to a machine particularly adapted for lasting the toe ends of stitchdown shoes of that type in which the margin of the lining is laid inwardly over an insole and the outturned margin of the other layer or layers of the upper materials (hereinafter frequently referred to distinctively as the upper) are pressed against the projecting margin of a sole member which, together with the upper, may be thereafter secured to an outsole. It is to be understood, however, that in various novel aspects the invention is more generally applicable to machines for lasting shoes of other types and for operating on other portions of a shoe, and in some aspects also to machines for performing operations other than lasting operations.

Important features of the invention are to be recognized in a novel organization of means for shaping different layers of shoe upper materials separately over an end of a last and for working the marginal portion of each layer of the upper materials into finally lasted relation to a sole. The illustrated embodiment of the invention comprises a power-operated organization having separate means for shaping the lining under tension to the end of the last and for wiping its marginal portion inwardly over an insole on the last and pressing it into adhering relation to the insole, and for pulling the upper and wiping it toward the bottom edge of the last and pressing its outturned flange against the projecting margin of a sole in a continuous operation of the machine.

As herein shown, there are provided different pairs of end-embracing wipers, and cooperating with each pair of wipers are a pair of clamping members or plates, the different pairs of clamping members being arranged initially to engage the marginal portions of the lining and upper respectively around the extreme end and along the sides of the end portion of the shoe. The different pairs of wipers and cooperating clamping members thus comprise different sets of instrumentalities mounted in superposed relation and arranged respectively to operate on the lining and the upper. The different pairs of wipers and clamping members of each set are independently mounted for movement heightwise of the shoe and also for bodily advancing movements lengthwise of the shoe and swinging or closing movements laterally of the shoe, and are operated and controlled by separate power-operated mechanisms which are interconnected so that the movements of the different sets of wipers and clamping members to shape the lining to the end of the last and to wipe and press its marginal portion inwardly over the insole, and to pull the upper and wipe it toward the bottom edge of the last and to press its outturned margin against the projecting margin of the sole, are imparted thereto in predetermined time relation. The machine herein shown is so organized that after the lining and upper have been shaped separately over the end of the last, the movements of the wipers and clamping members for operating on the upper are momentarily suspended until after the lining wipers and their associated clamping members have completed their movements to wipe the margin of the lining inwardly over the insole and press it on the insole, the clamping members associated with the lining wipers being moved relatively to the wipers at a predetermined time in their inward movements to release the margin of the lining. Thereafter the lining wipers and clamping members are moved outwardly into inoperative positions, and the clamping members associated with the upper wipers are withdrawn to permit the upper wipers to resume their movement heightwise of the last to press the outturned flange of the upper against the projecting margin of the sole.

In the illustrated machine, the last and its shoe materials are positioned relatively to the wipers by means which is substantially the same as that shown and described in United States Letters Patent No. 1,674,060, granted June 19, 1928, on an application filed in the name of A. F. Pym. This means comprises a plurality of pins which are arranged to extend through holes in the insole secured to the bottom of the last and into sockets formed in metal bushings which are seated in the last. As herein shown, the pins are arranged also to extend through holes formed in the forepart of an unattached extension sole, against the projecting margin of which the outturned flange of the upper is to be pressed, to position the sole in predetermined relation to the forepart of the last. In accordance with a further feature of the invention there is provided means operating in time relation to the operative movements of the wipers for applying the extension sole on said positioning means to the shoe and for supporting its projecting margin during the flange pressing operation. This means comprises, as herein illustrated, a plate slidably mounted on the pins and arranged initially to support an unattached extension sole, including its projecting margin, a predetermined distance below the bottom face of the shoe. In the operation of the machine the plate is moved upwardly to press the sole against the overlaid margin of the lining after the lining wipers and their associated clamping members have been moved outwardly and before the upper wipers have been moved into position to press the outturned margin of the upper against the projecting margin of the sole.

The above and other features of the invention, including various novel details of construction and combinations of parts, will now be more particularly described with reference to the accompanying drawings and pointed out in the claims.

Figure 1:
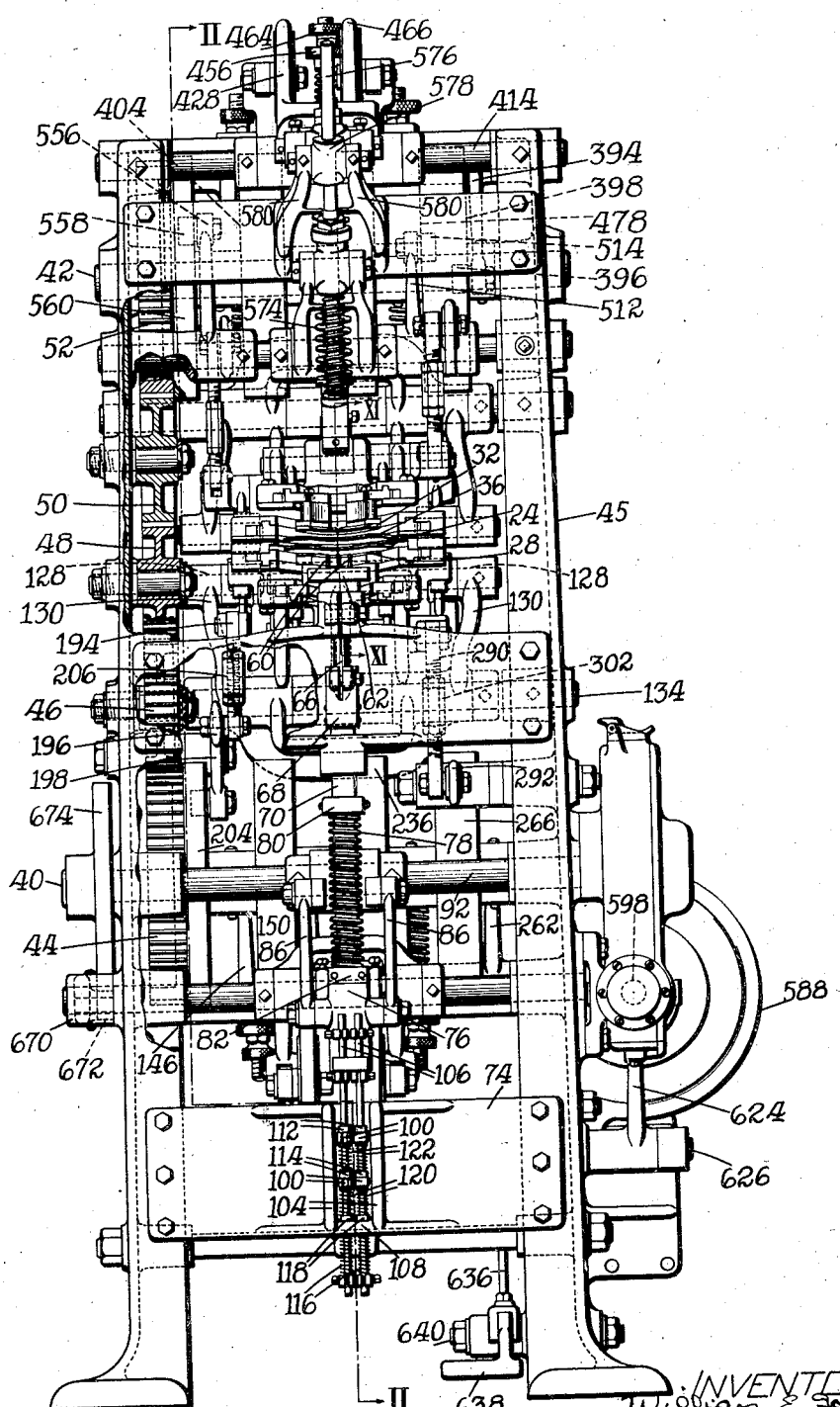
Fig. 1 is a view in front elevation, partly in section, of a machine embodying the present invention.

The different sets of wipers and clamping members are mounted in superposed relation and comprise a lower set 20 (Fig. 2) for shaping the lining over the end of the last and for wiping its marginal portion inwardly over the insole and pressing it against the insole, and an upper set 22 for working the upper over the end of the last and pressing its outturned flange against the projecting margin of a sole. The lower set of wipers and clamping members comprises a pair of wipers 24 connected to a carrier 26 and a pair of clamping plates 28 supported just below the wipers 24 by a carrier 30. The upper set of wipers and clamping members comprises a pair of wipers 32 connected to a carrier 34 and a pair of clamping plates 36 supported just below the wipers 32 by a carrier 38. For imparting to each pair of wipers and to each pair of clamping plates their swinging or closing movements widthwise of the shoe there is provided mechanism which is substantially the same as that disclosed in United States Letters Patent No. 1,864,669, granted June 28, 1932, on an application filed in our names. Each carrier of each set is connected near its rear end to mechanism, hereinafter described, for imparting to its movements lengthwise of the shoe, and near its front end each carrier is supported by mechanism which will presently be described and which permits it to be moved lengthwise of the shoe and controls its movements heightwise of the shoe. In the illustrated machine the different mechanisms for imparting to the carriers 26 and 30 of the lower set their movements lengthwise and heightwise of the shoe and the mechanisms for imparting to the wipers 24 and the clamping plates 28 their swinging or closing movements widthwise of the shoe are controlled by cams on a cam shaft 40. The different mechanisms for imparting to the carriers 34 and 38 of the upper set their movements lengthwise and heightwise of the shoe and the mechanisms for imparting to the wipers 32 and the clamping plates 36 their swinging or closing movements laterally of the shoe are controlled by cams on a cam shaft 42. The shafts 40 and 42 are mounted in suitable bearings on the frame 45 of the machine and are connected by a train of gears 44, 46, 48, 50 and 52 (Fig. 1), the gears 44 and 52 being fast, respectively, on the shafts 40 and 42.

In the illustrated machine the position of the last and its shoe materials relatively to the wipers and clamping members is determined by means which, as above stated, is substantially the same as that disclosed and claimed in Letters Patent of the United States No. 1,674,060, granted June 19, 1928, on an application filed in the name of A. F. Pym. For this purpose there is provided a bushing 54 mounted in a split bearing 56 at the front of the machine and having a head portion 58 provided with apertures to receive the shank portions of three pins 60 (Figs. 1, 11, 12, 13 and 14) which are arranged to project through holes in an insole a and into sockets formed in metal bushings 64 which are seated in the last. These pins determine the position of the last and shoe with respect to lengthwise and widthwise bodily movements and with respect to lateral swinging movement, and in cooperation with the bushings 64, they also determine the plane in which the bottom face of the insole is presented for the lasting operation, the upper end faces of the pins engaging the bushings for this purpose, all as fully disclosed in the above-mentioned Letters Patent No. 1,674,060. While the above construction constitutes a very effective means for positioning a shoe in proper relation to the wipers, it will be understood that the present invention, in many of its aspects, is not limited to the particular shoe-positioning means herein shown.

For purposes of this invention there is slidably mounted on the pins 60 a plate 62 which is arranged initially to support a middle sole b a predetermined distance below the bottom face of the insole a. The pins 60 extend upwardly through openings in the plate and also through holes in the forepart of the sole b so that the sole is located both lengthwise and widthwise of the last in predetermined relation to the edge curvature of its forepart portion. The plate 62 corresponds substantially in size and shape to the forepart of a stitchdown shoe sole including the marginal extension thereof and as shown is formed integral with a downwardly extending rod 66 which is vertically movable in the bushing 54 and to the lower end of which there is clamped a collar 68 (Fig. 2) which is pinned to the upper end portion of a rod 70. The rod 70 extends downwardly and is vertically movable in a lower bearing 72 formed in a bracket 74 which is fast on the frame of the machine. At a predetermined time in the cycle of the machine, as hereinafter more fully explained, the plate 62 is moved upwardly to apply the middle sole b to the bottom face of the shoe and to support the projecting margin of the sole b during the flange-pressing operation on the upper. For imparting such upward movement to the plate 62 and its supporting rod 70 there is provided a sleeve 76 (Figs. 1 and 2) which is slidingly movable on the rod 70 and acts through a spring 78 in engagement at its upper end with a collar 80 fast on the rod 70 to raise the rod and the plate 62 to carry the middle sole b into engagement with the bottom face of the insole a. The sleeve 76 bears at its upper end on a collar 82 slidingly mounted on a reduced end portion of the rod 70 and engaging the lower end of the spring 78, the lower face of this collar being arranged to engage a shoulder 84 on the rod, when the parts are in their starting positions, so that the spring 78 is, at that time, under a substantial amount of compression between the two collars 80, 82. The sleeve 76 is connected by links 86 to forwardly extending arms 88 of a bell crank lever 90 loosely journaled upon a transversely extending shaft 92 mounted in the frame 45. The lever 90 has a rearwardly extending arm 94 carrying a cam roll 96 arranged to engage a suitable path cam formed in one side of a cam wheel 98 fast on the cam shaft 40. It will be understood that the lever 90 acts through the spring 78 to raise the rod 70 and the parts supported thereon and thus to carry the middle sole b into contact with the insole a, after which the spring is further compressed by continued movement of the lever.

Figure 2:
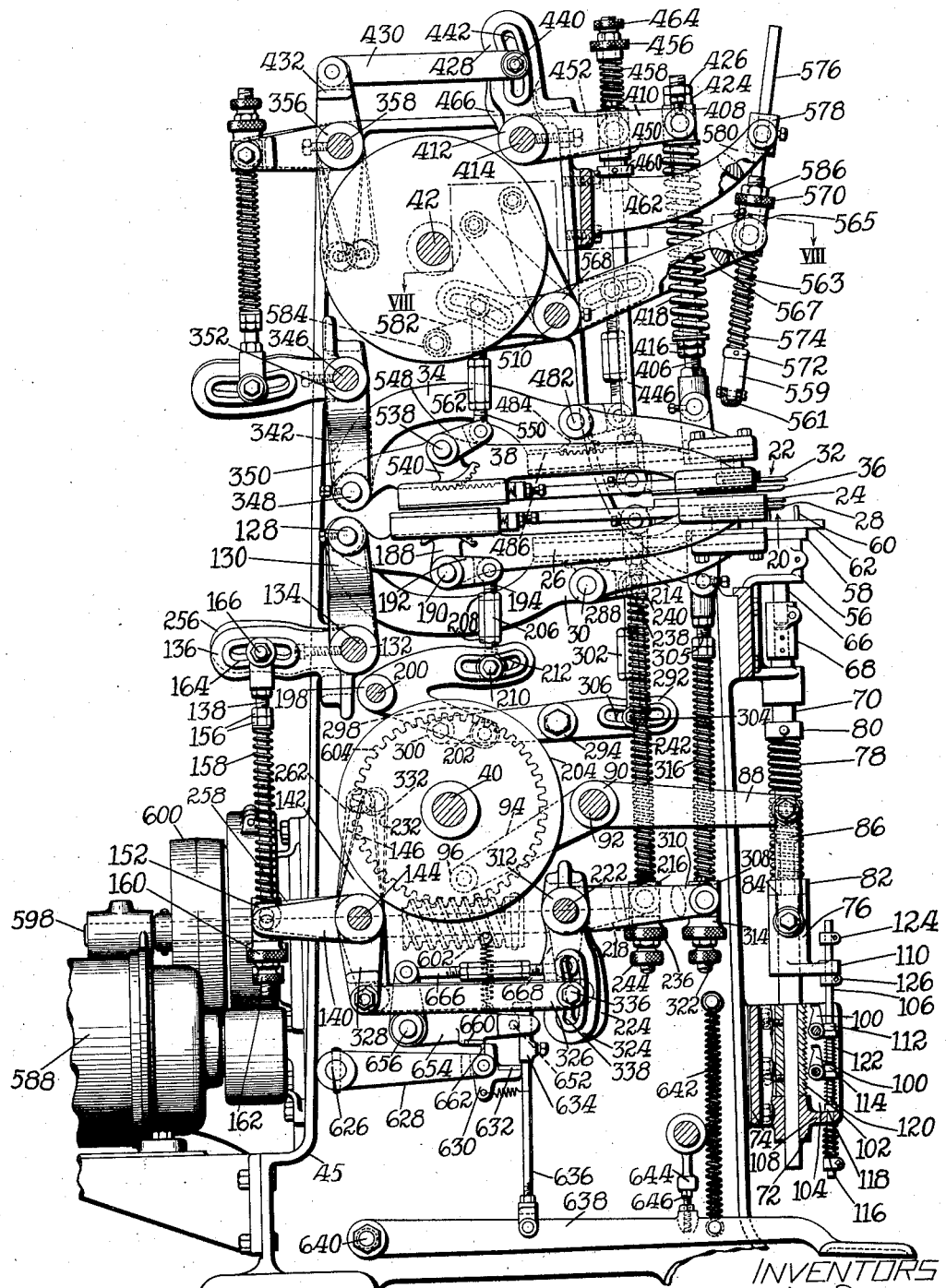
Fig. 2 is a section on the line II—II of Fig. 1.

There is further provided means for locking the rod 70 positively against reverse downward movement comprising a plurality of pawls 100, which in the construction shown are four in number, these pawls being arranged to cooperate with ratchet teeth formed on a member 102 which is secured upon a reduced end portion of the rod 70. The pawls are pivotally supported on upwardly extending side portions 104 of the bracket 74 and are controlled by rods 106 which are slidingly mounted in a projection 108 of the bracket 74 and a projection 110 of the sleeve 76. Each of these rods is arranged to control two of the pawls and has fast thereon collars 112 and 114 which are arranged to engage the tails of the pawls to hold the latter out of engagement with the ratchet teeth when the parts are in starting positions, as illustrated in Figs. 1 and 2. A spring 116 on each rod below the projection 108 tends to move the rod downwardly, such movement of the rod being limited by a collar 118 which is fast thereon and engages the projection 108. Between the collar 118 and the tail of the lower pawl is a spring 120 and between the collar 114 and the tail of the upper pawl is a spring 122. It will be understood that upon upward movement of the rods 106 the pawls are swung yieldingly inward against the ratchet teeth through the springs 120, 122. Such upward movement is imparted to each rod by engagement of the projection 110 of the sleeve 76 with a collar 124 which is fast on the rod. It will be evident that such upward movement is not imparted to the rods 106 until near the end of the upward movement of the sleeve 76 so that the pawls are not carried into operative relation to the ratchet teeth until the upward movement of the rod 70 has been substantially completed. The pawls 100 serve to lock the rod 70 against any downward movement during the operation of the wipers 32 to press the outturned flange of the sole b upper against the projecting margin of the sole b, and early in the return of the parts to starting positions they are swung away from the ratchet teeth to permit the plate 62 to be moved away from the bottom of the shoe. To insure disengagement of the pawls from the ratchet teeth there is fast on each rod 106 a collar 126 which is engaged by the projection 110 in the downward movement of the sleeve 76.

Figure 5:
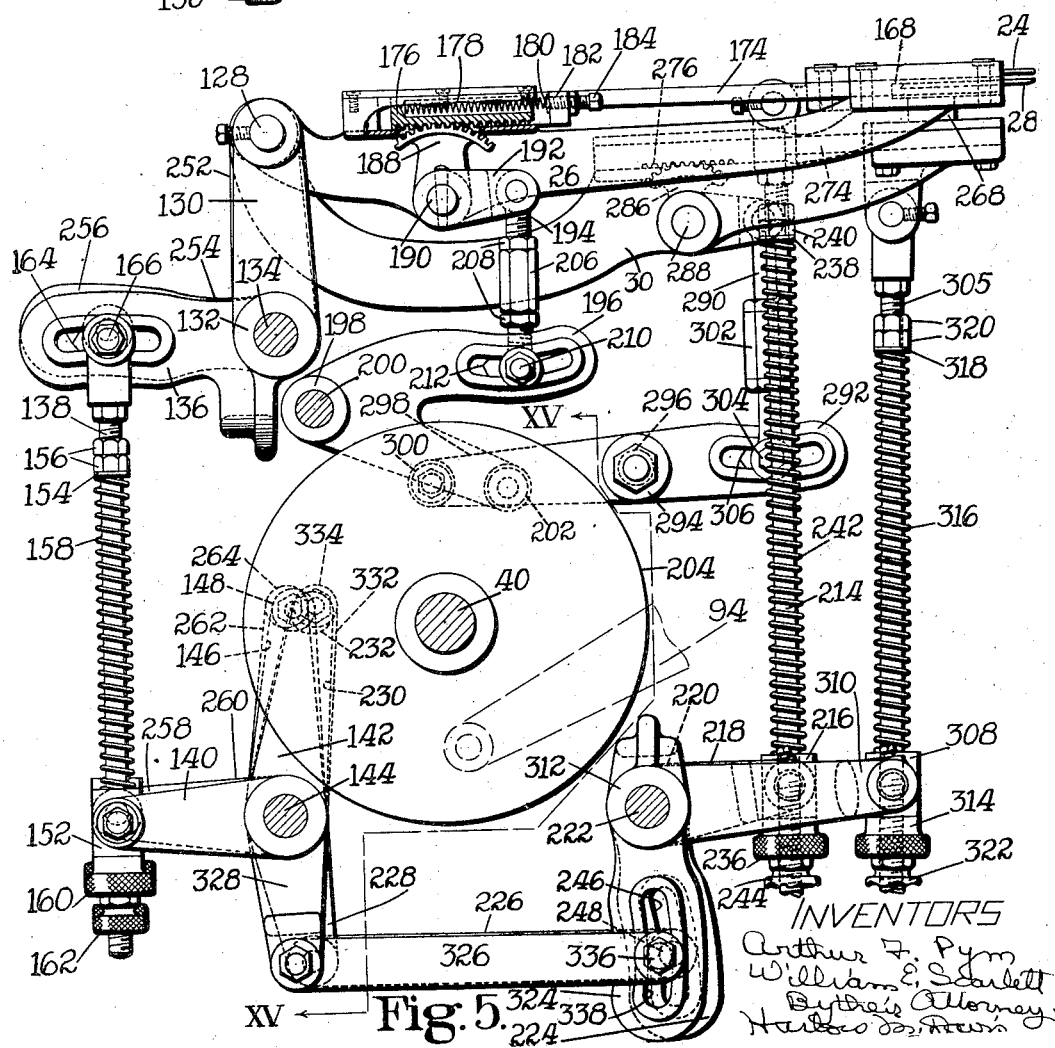
Fig. 5 is an enlarged view in side elevation of the lining wiper and clamp mechanism.

The carrier 26 for supporting the wipers 24 of the lower set is pivotally mounted at its rear end on short shafts 128 which are carried by the upwardly extending arms 130 of a bell crank lever 132 mounted to swing on a fixed rod 134 supported on the frame 45. The bell crank lever 132 has a rearwardly extending arm 136 connected by a rod 138 to one arm 140 of a bell crank lever 142 (Figs. 2, 5 and 15) which is loosely journaled on a fixed shaft 144 supported on the frame 45 and has an upwardly extending arm 146 carrying a cam roll 148 engaging a suitable path cam formed in one side of a cam wheel 150 fast on the shaft 40. Slidingly mounted on the rod 138 and pivotally connected to the outer end of the arm 140 is a sleeve 152 (Fig. 5). Surrounding the rod 138 and bearing at one end against the sleeve 152 and at the other end against a washer 154, supported by a nut and lock nut 156 threaded on the rod, is a compression spring 158 which is held under a small amount of compression between the washer and the sleeve, when the parts are in starting positions, and through which movement is transmitted from the sleeve to the rod. Threaded on the rod is a nut 160 which is held against the bottom face of the sleeve 152 by the spring 158 and is locked against movement relatively to the rod by a lock nut 162. It will be evident that the initial tension of the spring 158 may be varied by adjustment of the nut and lock nut 156 and that by turning the nut 160 the bell crank lever 132 is swung about its pivot to adjust the carrier 26 and the wipers 24 lengthwise of the shoe. The rod 138 is adjustable also relatively to the bell crank lever 132 in such manner as to vary the amount or rate of advancing movement of the wipers 24 lengthwise of the shoe. For this purpose there is provided a slot 164 in the arm 136 of the bell crank lever 132 along which a stud 166 carried by the rod can be adjusted and then secured in adjusted position in a well-known manner. It will be evident that this adjustment varies the effective length of that arm of the bell crank lever 132 in which the slot is formed.

The wipers 24 are mounted for closing movements laterally of the shoe on wiper holders 168 (Figs. 5 and 6) which are guided by a curved slot 170 on the wiper carrier 26 and are provided on their outer edges with rack teeth 172 engaged by cooperating teeth formed on rack bars 174 which are mounted on the carriers 26 for sliding movements lengthwise of the shoe. For operating the rack bars 174 there are provided other rack bars 176 also slidingly mounted on the wiper carrier 26 and arranged to impart movement yieldingly to the rack bars 174 through springs 178 mounted partially within recesses within the rack bars 176 and arranged to engage small plates 180 which bear on lugs 182 on the rack bars 174 or on the ends of adjusting screws 184 which are mounted in these lugs. The wipers 24 are thus closed yieldingly through the springs 178, the initial tension of which may be varied by the screws 184. In the return of the parts to starting positions the rack bars 176 engage lugs 186 on the rack bars 174 to return the latter and open the wipers.

The rack bars 176 have rack teeth on their lower faces in engagement with teeth formed on gear sectors 188, as illustrated in Fig. 5, these gear sectors being fast on a rockshaft 190 mounted in bearings on the carrier 26. Extending forwardly from one of the gear sectors is a lever arm 192 which is connected by a rod 194 to one arm 196 of a bell crank lever 198 loosely mounted on a shaft 200 supported on the frame 45. The other arm of the bell crank lever carries a roll 202 engaging a suitable path cam formed in one side of a cam wheel 204 (Fig. 15) fast on the shaft 49. The rod 194 is formed in two parts connected by a turnbuckle 206 which may be turned to vary the length of the rod and which is held in adjusted position by lock nuts 208 threaded on the rod and engaging the opposite end faces of the turnbuckle. It will thus be evident that by rotating the turnbuckle the gear sectors 188 may be adjusted relatively to the bell crank lever 198 to swing the wipers toward or from each other and thus to determine the limit of their closing movements. The connection between the lower end of the rod 194 and the arm 196 consists of a stud 210 adjustable along a curved slot 212 in the arm and adapted to be secured in adjusted position in a well-known manner. This adjustment serves to vary the amount of closing movement of the wipers or the rate of their closing movement.

For supporting the front end portion of the wiper carrier 26 and for moving the carrier to impart to the wipers 24 their movements heightwise of the shoe there is provided a rod 214 upon the lower end portion of which there is slidingly mounted a sleeve 216 pivotally connected to the forked end of one arm 218 of a bell crank lever 220 loosely mounted on a shaft 222 which is supported in suitable bearings by the frame 45. The bell crank lever 220 has a downwardly extending arm 224 connected by a link 226 to one arm of a lever 228 which is loosely mounted on the shaft 144 and has an upwardly extending arm 230 carrying a cam roll 232 arranged to engage a suitable path cam formed in one side of the cam wheel 98. Threaded on the lower end of the rod 214 is a nut 236 and surrounding the rod, between the sleeve 216 and a washer 238 supported by a nut and lock nut 240 threaded on the rod, is a compression spring 242, the initial compression of which may be varied by adjustment of the nut and lock nut 240. The spring 242 is held under a sufficient amount of compression, when the parts are in their starting positions, to hold the nut 236 against the sleeve 216. It will be evident that by adjusting the nut 236 the position of the carrier 26 relatively to the arm 218 of the lever 220 may be varied to determine the position of the wipers 24 heightwise of the shoe, the carrier 26 being preferably so adjusted that when the machine is initially at rest the wipers 24 are located a considerable distance above the bottom face of the insole a. A nut 244 threaded on the lower end of the rod 214 is provided for locking the nut 236 in adjusted position. The arm 224 of the bell crank lever 220 has a curved slot 246 formed therein along which a stud 248 carried by the link 226 may be moved and then locked in adjusted position to vary the effective length of the arm 224 and thus to determine the amount or limit of heightwise movement imparted to the wipers 24.

Figure 6:
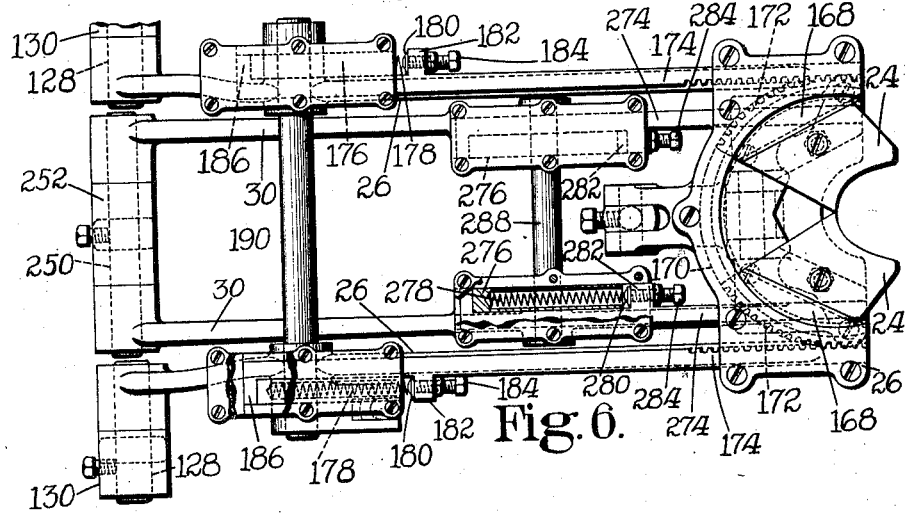
Fig. 6 is a plan view of the mechanism shown in Fig. 5 with parts broken away.
Figure 15:
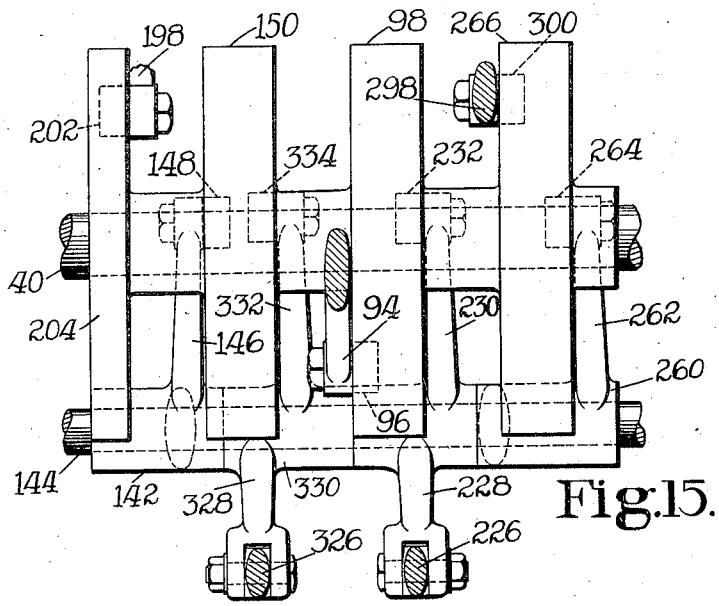
Fig. 15 is a section on the line XV—XV of Fig. 5.

The carrier 30 for supporting the clamping plates 28 of the lower set is pivotally mounted at its rear end on a short shaft 250 supported by the upwardly extending arm 252 of a bell crank lever 254 loosely journaled on the shaft 134 (Figs. 5 and 6). The bell crank lever 254 has a second arm 256 and between this arm and the rearwardly extending arm 258 of a bell crank lever 260 loosely mounted on the shaft 144 are connections which are substantially the same as those between the arm 136 of the bell crank lever 132 and the arm 140 of the bell crank lever 142. It will be understood that these connections are such that they may be adjusted to move the bell crank lever 254 relatively to the bell crank lever 260 to vary the position of the carrier 30 lengthwise of the shoe as well as to vary the effective length of the arm 256 of the bell crank lever 254 to vary the amount of advancing movement of the plates 28 or the rate of such movement. The lever 260 has an upwardly extending arm 262 carrying a cam roll 264 engaging a suitable path cam formed in one side of a cam wheel 266 fast on the shaft 49 (Figs. 2, 5 and 15).

The clamping plates 28 are mounted for closing movements laterally of the shoe and as shown (Figs. 5 and 11) are connected to holders 268 which are guided by a curved slot 270 in the carrier. In order to permit the clamping plates 28 to be positioned heightwise of the shoe close to the wipers 24 the holders 268, as shown particularly in Fig. 11, extend upwardly within a recess in the carrier 26, the plates 28 being secured to the shouldered upper faces of the holders by screws 272. The mechanism for imparting to the holders 268 and the plates 28 their swinging or closing movements widthwise of the shoe is substantially the same as the mechanism hereinbefore described for imparting to the wipers 24 their closing movements. This mechanism comprises rack bars 274 (Figs. 5 and 6) the teeth of which are arranged to engage teeth formed on the outer edges of the holders 268 and other rack bars 276 which are arranged to impart movements yieldingly to the rack bars 274 in a direction lengthwise of the shoe through springs 278 which are mounted partially in recesses formed in the rack bars 276 and engage small plates 280 which bear on lugs 282 on the rack bars 274 or on the ends of adjusting screws 284 which are mounted in these lugs. The rack bars 276 have rack teeth on their lower faces engaging teeth formed on gear sectors 286 fast on a rockshaft 288 mounted in bearings on the carrier 30. One of the gear sectors has a lever arm connected by an adjustable rod 290 to one arm 292 of a lever 294 loosely mounted on a shaft 296 supported by the frame 45. The lever 294 has a second arm 298 carrying a cam roll 300 engaging a suitable path cam formed in one side of the cam wheel 266. The rod 290 is formed in two parts, the two parts of the rod being connected by a turnbuckle 302 so that the length of the rod may be varied to determine the limit of their closing movements, a bolt 304 carried by the rod is adjustable along a curved slot 306 in the arm 292 to vary the effective length of that arm and thus to vary the amount or rate of closing movement of the plates 28.

For supporting the front end portion of the carrier 30 and for moving the carrier to impart to the plates 28 their movements heightwise of the shoe there is provided a rod 305 (Figs. 2 and 5) which extends downwardly through a sleeve 308 pivotally connected to the forked end of one arm 310 of a bell crank lever 312 loosely mounted on the shaft 222. Threaded on the lower end of the rod 305 is a nut 314 which is held in engagement with the lower face of the sleeve 308 by a compression spring 316 surrounding the rod between the sleeve 308 and a washer 318 supported by a nut and lock nut 320 which are threaded on the rod and are preferably so adjusted that when the parts are in starting positions the spring 316 is held under a small amount of compression. It will be seen that by adjusting the nut 314 the carrier 30 may be swung about its pivot 250 to vary the heightwise position of the plates 28 relatively to the wipers 24, a lock nut 322 being provided for holding the nut 314 in adjusted position. The bell crank lever 312 has a downwardly extending arm 324 connected by a link 326 to one arm 328 of a lever 330 (Fig. 15) which is loosely mounted on the shaft 144 and has a second arm 332 carrying a cam roll 334 engaging a suitable path cam formed in one side of the cam wheel 150. The link 326 carries a bolt 336 adjustable along a curved slot 338 in the arm 324 of the lever 312 to vary the effective length of that arm and thus to determine the amount of heightwise movement imparted to the plates 28.

The plates 28 are located initially heightwise of the shoe just below the wipers 24 and in the operation of the machine are moved upwardly through the spring 316 to clamp the marginal portion of the lining continuously around the toe end of the shoe and along the sides of the toe end against the bottom face of the wipers. Thereafter the levers 220 and 312 are swung in a direction to move the wipers and plates heightwise of the shoe downwardly toward the edge of the insole and in this movement the lining is pulled lengthwise of the last and is also conformed tightly and closely to the toe-end portion of the last. It will be understood that as the wipers 24 and plates 28 are thus moved downwardly to pull the lining, the spring 316 acts to hold the margin of the lining clamped between the wipers 24 and the plates 28 and that slipping of the margin relatively to the wipers and plates will occur if the resistance to such slipping movement resulting from the gripping pressure of the wipers and plates is overcome by the force of the pull applied. By reference to Fig. 5 it will be seen that the heightwise movements of the wipers and plates to pull the lining are effected positively through the rods 214 and 306, and that the amount of this pulling movement is determined by the positions of the bolts 248 and 336 in the curved slots 246 and 338 formed respectively in the arms 224 and 324 of the levers 220 and 312. At the completion of the lining-pulling operation, the wipers 24 are advanced and closed to wipe the margin of the lining inwardly over the insole, the plates 28 being advanced with the wipers and partially closed until the wipers have been moved inwardly over the edge of the insole to control the lining, after which the plates are moved relatively to the wipers to release the lining as the wipers continue their overwiping movement. At the completion of the overwiping operation the lever 220 is swung first in a direction to compress the spring 242 to increase the pressure of the wipers on the lining and thus to force its marginal portion, to which cement has been previously applied, into firm adherence to the insole, and then in the opposite direction to relieve the pressure of the wipers on the lining, after which the wipers and plates are moved from the positions shown in Fig. 13 to the positions shown in Fig. 14.

Figures 3, 4:
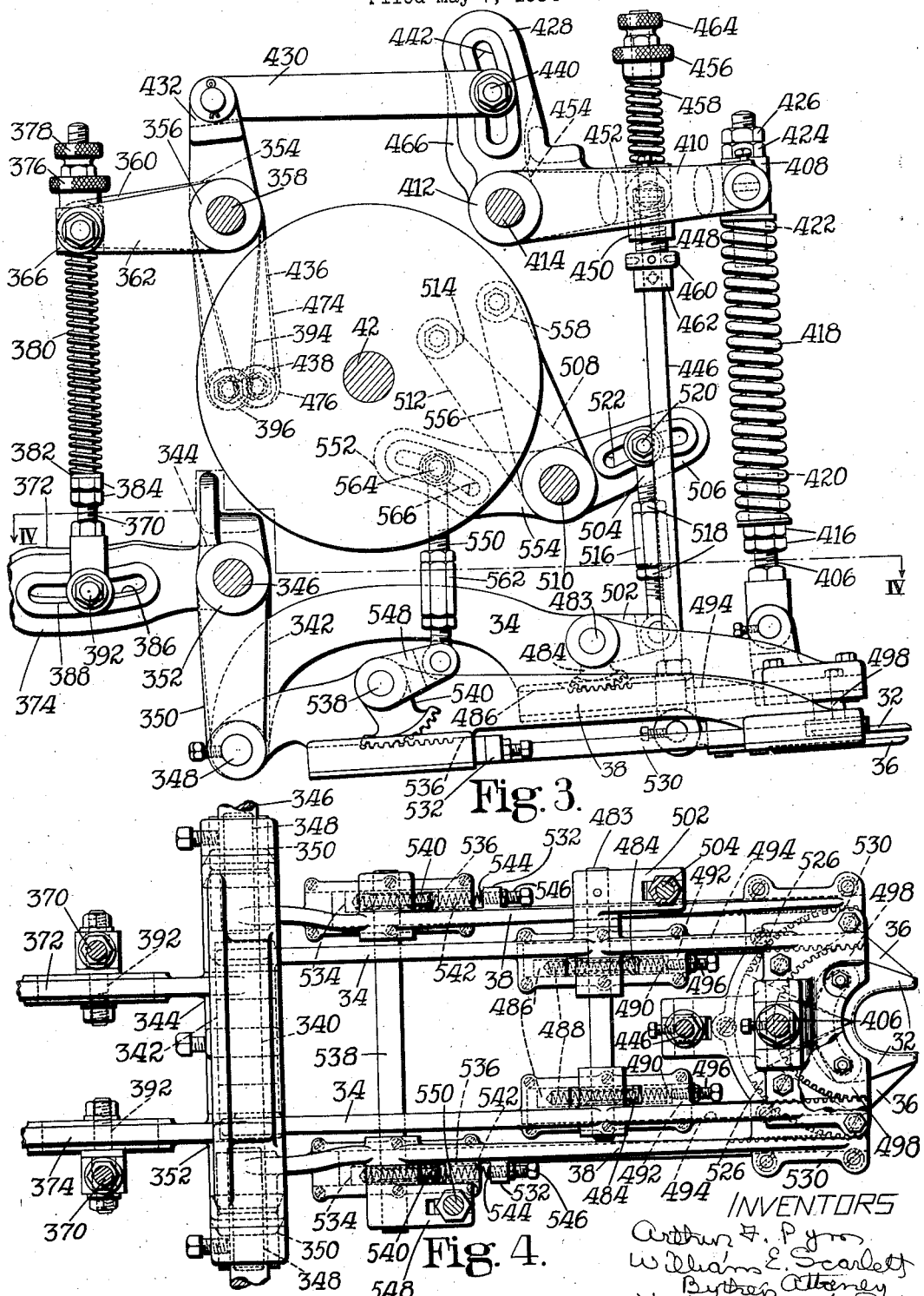
Fig. 3 is an enlarged view in side elevation of the upper wiper and clamp mechanism.
Fig. 4 is a section on line IV—IV of Fig. 3.

Except that they are inverted, the carriers 34 and 38 of the upper set are substantially duplicates of the carriers 30, 26 of the lower set. The carrier 34, to which the wipers 32 are connected, is pivotally mounted at its rear end on a short shaft 340 supported by the downwardly extending arm 342 of a lever 344 loosely mounted on a shaft 346 supported by the frame of the machine (Figs. 2, 3 and 4). The carrier 38 for supporting the plates 36 is pivotally mounted at its rear end on short shafts 348 supported by the downwardly extending arms 350 of a bell crank lever 352 also loosely mounted on the shaft 346. For swinging the bell crank levers 344 and 352 about the shaft 346 in directions to impart to the carriers 34 and 38 their movements lengthwise of the shoe there are provided connections from the bell crank levers to cams on the cam shaft 42, which connections are substantially the same as those above described through which swinging movements are imparted to the bell crank levers 132 and 254 to impart to the carriers 26, 30 their lengthwise movements. These connections comprise bell crank levers 354, 356 (Figs. 3 and 7) which are loosely mounted upon a transversely extending shaft 358 supported in suitable bearings on the frame 45. The levers 354, 356 are provided, respectively, with rearwardly extending arms 360, 362 to the outer ends of which there are pivotally connected blocks 364, 366. Extending through the blocks 364, 366 are rods 368, 370 the lower ends of which are connected respectively to rearwardly extending arms 372, 374 of the bell crank levers 344, 352. Threaded on the end of each rod is a nut 376 and a lock nut 378, and surrounding each rod is a compression spring 380 which engages at its lower end a washer 382 supported by a nut and lock nut 384 threaded on the rod. The spring 380 on the rod 368 bears at its upper end on the block 364, and the spring 380 on the rod 370 bears at its upper end on the block 366. It will be understood that when the machine is initially at rest the springs 380 are held under a small amount of compression. The arms 372, 374 of the bell crank levers 344, 352 are provided, respectively, with curved slots 386, 388 along which studs 392 carried by the rods 368, 370 may be moved and then locked in adjusted position to vary the effective lengths of these arms and thus to determine the extent of forward movement imparted to each of the carriers 34 and 38. The bell crank lever 354 has an arm 394 carrying a cam roll 396 engaging a suitable path cam formed in one side of a cam wheel 398 which is fast on the shaft 42. The bell crank lever 356 has an arm 400 carrying a cam roll 402 operated upon by a suitable path cam formed in one side of a cam wheel 404 fast on the shaft 42.

Figure 7:
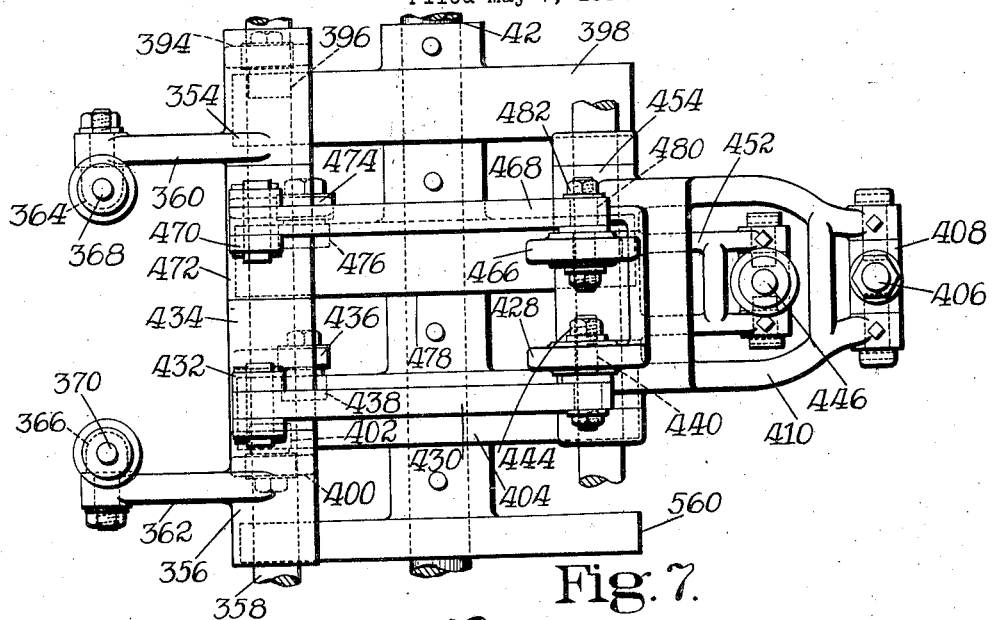
Fig. 7 is a plan view of parts shown in Fig. 3.

Near its front end the carrier 34 has pivotally connected to it a rod 406 (Figs. 3, 4, 7 and 8) which is vertically movable in a block 408 pivotally connected to the forked end of one arm 410 of a bell crank lever 412 loosely mounted on a shaft 414 supported by the frame 45 of the machine. Between the block 408 and a nut and lock nut 416 threaded on the rod is a stiff compression spring 418 which bears at one end against the head of a bushing 420 which is slidably mounted on the rod and is supported by the nut and lock nut 416. At its other end the spring 418 bears against the head of a bushing 422 also slidingly mounted on the rod 406 and engaging the lower face of the block 408, the bushings 420, 422 acting to centralize the spring on the rod. By adjustment of the nut and lock nut 416 the tension of the spring 418 may be varied. Threaded on the upper end of the rod is a nut 424 which may be adjusted to determine the position of the wipers 32 heightwise of the shoe, a lock nut 426 being provided for holding the nut 424 in adjusted position. The bell crank lever 412 has an upwardly extending arm 428 connected by a link 430 to one arm 432 of a lever 434 loosely mounted on the shaft 358 (Fig. 7). The lever 434 has a second arm 436 carrying a cam roll 438 engaged by a suitable path cam formed in one side of the cam wheel 404. The link 430 carries a bolt 440 which is adjustable along a curved slot 442 formed in the arm 428 of the lever 412 to vary the effective length of this arm and thus to determine the amount of heightwise movement imparted to the wipers, a nut 444 on the end of the bolt 440 being provided for locking it in adjusted position.

For supporting the carrier 38 there is pivotally connected to it near its front end a rod 446 (Figs. 2, 3 and 4) vertically movable in a bushing 448 threaded into a block 450 which is pivotally connected to the forked end of one arm 452 of a bell crank lever 454 loosely mounted on the shaft 414 (Figs. 3 and 7). Surrounding the rod 446 between the block 450 and a nut 456 threaded on the end of the rod is a light compression spring 458. The bushing 448 has a head 460 which bears on a collar 462 secured to the rod. The head 460 is provided with apertures to receive the end of a tool for turning the bushing, the construction being such that as the bushing is rotated in one direction it acts through the collar 462 to lower the rod against the resistance of the spring 458 and, as it is rotated in the opposite direction, the rod 446 is raised by the action of the spring 458 on the nut 456. The carrier 38 may thus be swung about its pivot 348 to determine the position of the clamping plates 36 heightwise of the shoe. It will be understood that the tension of the spring 458 may be varied by adjustment of the nut 456, a locknut 464 being provided for holding the nut in adjusted position. The bell crank lever 454 has a second arm 466 connected by a link 468 (Fig. 7) to the upwardly extending arm 470 of a lever 472 loosely mounted on the shaft 358. The lever 472 is provided with a downwardly extending arm 474 carrying a roll 476 which engages a suitable path cam formed in one side of a cam wheel 478 fast on the shaft 42. The link 468 carries a bolt 480 which is adjustable along a curved slot in the arm 466 of the bell crank lever 454 and is locked in adjusted position by a nut 482 threaded on the end of the bolt. By adjusting the position of the bolt 480 in the curved slot in the arm 466 the effective length of that arm may be varied to determine the amount of heightwise movement imparted to the clamping plates 36.

Figure 8:
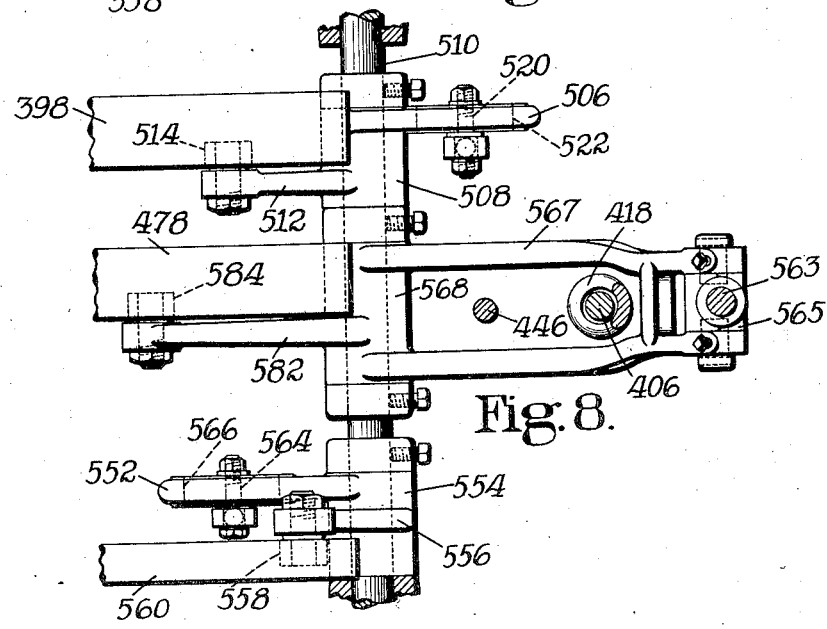
Fig. 8 is a section on the line VIII—VIII of Fig. 2.
Figure 11:
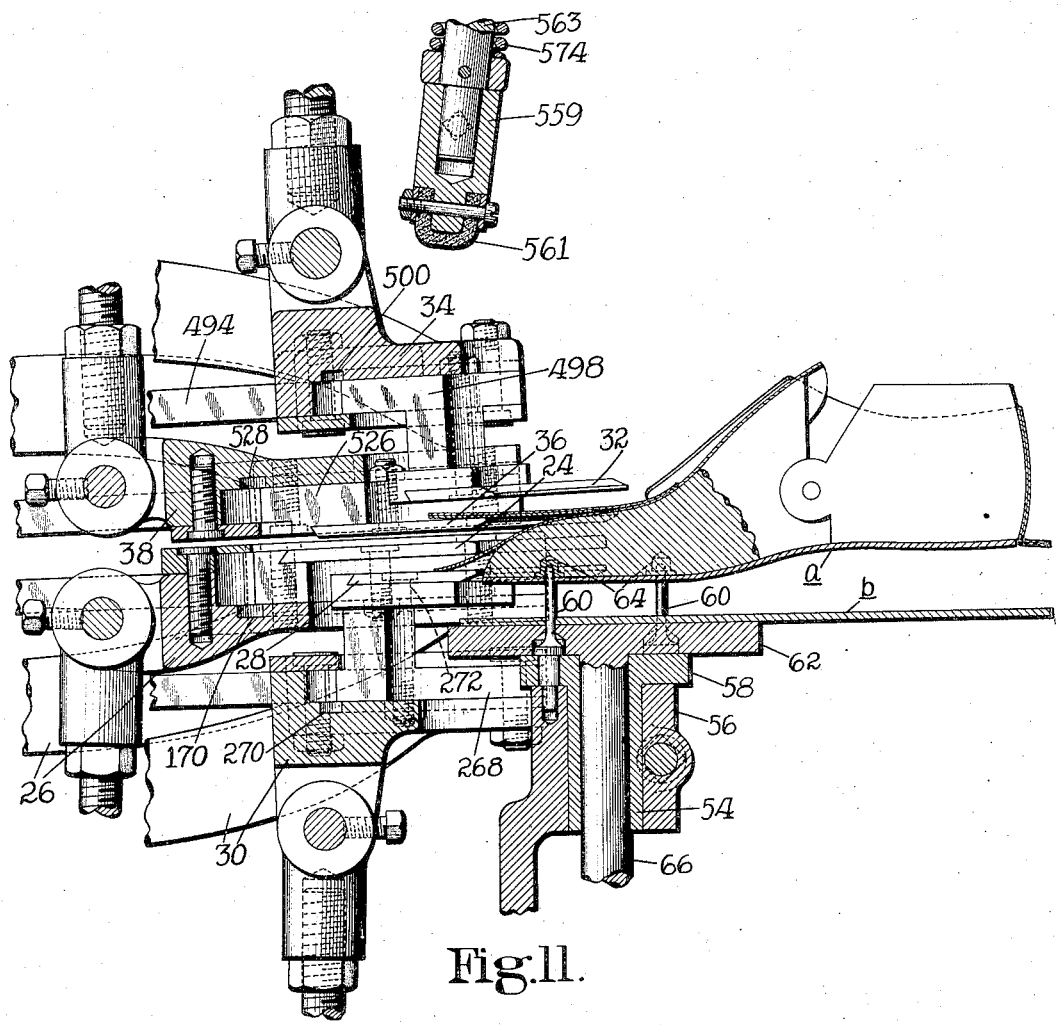
Figs. 11, 12, 13 and 14 are views illustrating different successive positions of the wipers and clamping means and the shoe in the operation of the machine.

For imparting to the wipers 32 and the clamping plates 36 their swinging or closing movements widthwise of the shoe there is provided mechanism which is substantially the same as that above described for imparting to the wipers 24 and the plates 28 their closing movements. As shown, particularly in Figs. 2, 3 and 4, there is mounted in suitable bearings on the carrier 34 a rockshaft 483 to which there are secured gear sectors 484 the teeth of which mesh with teeth formed upon the upper faces of small rack bars 486 slidingly mounted for movements in directions lengthwise of the shoe on the carrier 34. Mounted in recesses in the rack bars 486 are springs 488 which bear against small plates 490 engaging lugs 492 on rack bars 494 or the ends of adjustable screws 496 mounted in these lugs. It will be understood that the rack bars 494 are slidingly mounted on the carrier 34 for movements in directions lengthwise of the shoe and they are provided with rack teeth on their inner side faces which engage teeth formed on the outer edges of wiper holders 498 to which the wipers 32 are secured. The wiper holders extend downwardly within a recess formed in the carrier 38 and are guided for swinging movements laterally of the shoe by curved slots 500 in the carrier 34 (Fig. 11). Secured to the rockshaft 482 is a lever arm 502 connected by a rod 504 to one arm 506 of a lever 508 loosely mounted upon a shaft 510 supported by the frame 45. The lever 508 has a second arm 512 carrying a roll 514 operated upon by a suitable path cam formed in one side of the cam wheel 398 (Fig. 8). In order that the wipers may be swung toward or from each other to vary their positions relatively to each other laterally of the shoe, the rod 504 is formed in two parts connected by a turnbuckle 516 having right and left hand threads engaging the two parts of the rod. Adjustment of the turnbuckle varies the length of the rod 504 and thus determines the initial position of the wipers relatively to each other laterally of the shoe. Lock nuts 518 threaded on the rod and engaging the opposite end faces of the turnbuckle serve to hold it in adjusted position. The rod 504 carries a bolt 520 which may be moved along a curved slot 522 formed in the arm 506 on the lever 508 to vary the effective length of that arm and thus to determine the amount of closing movement imparted to the wipers.

The clamping plates 36 are connected to holders 526 (Fig. 4) which are guided for swinging movements laterally of the shoe by curved slots 528 formed in the carrier 38 (Fig. 11). The holders have teeth formed on their outer edges which engage teeth formed on rack bars 530 provided with spaced lugs 532, 534 between which short rack bars 536 are slidingly mounted for movements in directions lengthwise of the shoe. Fast on a rockshaft 538 supported by the carrier 38 are gear sectors 540 which are arranged to act through the rack bars 536 to impart to the rack bars 530, through springs 542 in engagement with small plates 544 bearing on the lugs 532 or on the ends of adjustable screws 546 mounted in these lugs, yielding movements in one direction to close the plates or, by engagement of the rack bars 536 with the lugs 534, positive movements in the opposite direction to open the plates. Secured to the rockshaft 538 is a lever arm 548 connected by a rod 550 to one arm 552 of a lever 554 loosely mounted on the shaft 510. The lever 554 has a second arm 556 carrying a cam roll 558 which engages a suitable path cam formed in one side of a cam wheel 560 fast to the shaft 42 (Fig. 8). The rod 550 is formed in two parts connected by a turnbuckle 562 which may be turned to vary the length of the rod and thus to determine the relative positions of the plates 36 laterally of the shoe, and the rod 550 carries a bolt 564 adjustable along a curved slot 566 in the arm 552 of the lever 554 so that the effective length of that arm may be varied to determine the amount of closing movement imparted to the plates 36.

Substantially at the time in the operation of the machine when the plates 28 are moved upwardly to clamp the margin of the lining against the wipers 24, the wipers 32, which are located initially above the last in closed position, are moved downwardly by the swinging of the lever 412 about its pivot 414 to press the marginal portion of the upper against the plates 36. It will be seen that the pressure of the wipers on the margin of the upper is applied through the heavy compression spring 418 so that as the wipers continue to move downwardly the plates 36 are moved with the wipers against the resistance of the light compression spring 458, which acts thereafter in the upper-pulling operation to force the plates 36 against the upper with sufficient gripping pressure so that the upper will not slip relatively to the wipers and plates until the desired tension has been applied to the upper. With the margin of the upper clamped against the wipers by the plates 36, the lever 454 is swung about the pivot 414 in time with the swinging of the lever 412 to move the plates 36 downwardly with the wipers to pull the upper. As the wipers 32 move toward the edge of the insole, they are swung away from each other against the resistance of the springs 488, by wedging action of the toe-end of the shoe thereon and thus act to wipe the upper materials tightly and smoothly over the end of the last, the gear sectors 484 being swung in a direction to permit the springs 488 to expand somewhat and the lever 344 being swung in a direction partially to retract the wipers as the wipers approach the edge of the insole, in order to prevent undue pressure of the wipers on the upper. As the wipers 32 are opened in response to pressure of the shoe against them and are partially retracted, the plates 36 are similarly swung away from each other with the wipers and are also partially retracted.

In order to support the shoe and last against the upwardly directed pressure of the wipers 24 as they move inwardly over the shoe bottom to wipe the marginal portion of the lining over the insole and then to press it into firm adherence to the insole there is provided a toe clamp 559, Figs. 2, 11, 13 and 14. To the shoe-engaging end of the toe clamp there is secured a pad 561 of yielding material, such as rubber, to prevent marking of the shoe upper. The toe clamp has a stem 563 which is slidingly mounted in a sleeve 565 pivotally connected to the outer forked end of one arm 567 of a lever 568 loosely mounted on the rod 510. Threaded on the stem 563 is a nut 570 which bears on the upper face of the sleeve, and surrounding the stem between the sleeve and a collar 572 pinned to the stem is a compression spring 574. The stem has a reduced end portion 576 which extends upwardly through a sleeve 578 which is pivotally connected to the forked outer end of an arm 580 secured to the frame 45. The lever 568 has a second arm 582 carrying a cam roll 584 operated upon by a suitable path cam formed in one side of the cam wheel 478 (Figs. 2 and 8). The position of the clamp heightwise of the shoe may be varied by adjustment of the nut 570, which adjustment is effective also to vary the tension of the spring 574, a lock nut 586 being provided for holding the nut 570 in adjusted position. It will be evident that as the lever 568 is swung in a clockwise direction, as viewed in Fig. 2, the toe clamp 559 will be moved downwardly with a component of movement lengthwise of the shoe. The lengths of arms 567 and 580 are such that by the time the arm 567 is moved into a substantially horizontal position the toe clamp 559 will have been moved into engagement with the top of the forepart of the shoe and the spring 574 will have been compressed sufficiently to hold the shoe and last on the pins 60 against displacement as the wipers 24 move inwardly to wipe and press the margin of the lining upon the insole.

The machine herein shown may be operated either by an electric motor 588 connected by a train of gears 590, 592 and 594 to a drum 596 loosely mounted on a shaft 598 (Figs. 9 and 10), the gear 594 being formed on the drum, or by a belt engaging a pulley 600 which is secured to, or is formed integrally with the drum. Fast on the shaft 598 is a worm 602 which meshes with a worm wheel 604 secured to the outer end of the shaft 40, Figs. 2, 9 and 10. The drum 596 is provided at one end with an internal friction clutch face 606 arranged to cooperate with a clutch member 608 slidingly mounted for lengthwise movement on the shaft 598 and which is arranged to engage a stationary brake surface 610 when it is not in engagement with the clutch face 606. The clutch member 608 is connected to the shaft 598 by a tongue 612 which projects into a slot formed in a collar 614 pinned to the shaft. Mounted in the hub of the clutch member 608 are springs 616 which bear against the collar 614 and tend to move the clutch member 608 into engagement with the clutch face 606 formed on the drum 596.

The hub of the clutch member 608 is provided with an annular groove 618 in which there are mounted blocks 620 (Fig. 10) provided with laterally extending reduced end portions 622 mounted in openings in the upper end of a forked arm 624 which is pinned to a short laterally extending shaft 626 fulcrumed in suitable bearings on the frame 45. Fast to the opposite end of the shaft 626 is a forwardly extending arm 628 on the end of which there is pivotally mounted a block 630 to which there is secured a plate 632 arranged to be engaged by the lower end of a sleeve 634 fast on a rod 636 pivotally connected at its lower end to a treadle 638 fulcrumed at 640 to the frame 45. A spring 642 (Fig. 2), connected at one end to the treadle 638 and at the other end to the frame of the machine, tends to hold the treadle in raised position, an abutment 644 being provided on the frame 45 for engaging an adjustable stop on the treadle, illustrated as a screw 646, (Fig. 2) to limit the upward movement of the treadle under the influence of the spring 642. A spring 648 (Fig. 9) connected at one end to the rod 636 and at the other end to the block 630 tends to hold these parts in the positions shown in Fig. 9 with the lower end of the sleeve 634 over a portion of the upper face of the plate 632. The position of the block 630 is determined by a lug 650 on the block in engagement with a portion of the lever 628. The position of the rod 636 is determined by a pin 652 against which the sleeve 634 is held by the spring 648, this pin being mounted in the end of one arm 654 of a lever which is fast on a rock shaft 656 mounted in the frame 45 and is provided with an upwardly extending arm 658 automatically controlled, as hereinafter described. The arm 654 carries a plate 660 which, with the parts in the position shown in Fig. 9, engages a plate 662 on the block 630 and thus maintains the arm 624 in position to disengage the clutch member 608 from the clutch face 606 and to hold it in engagement with the brake surface 610.

Figure 9:
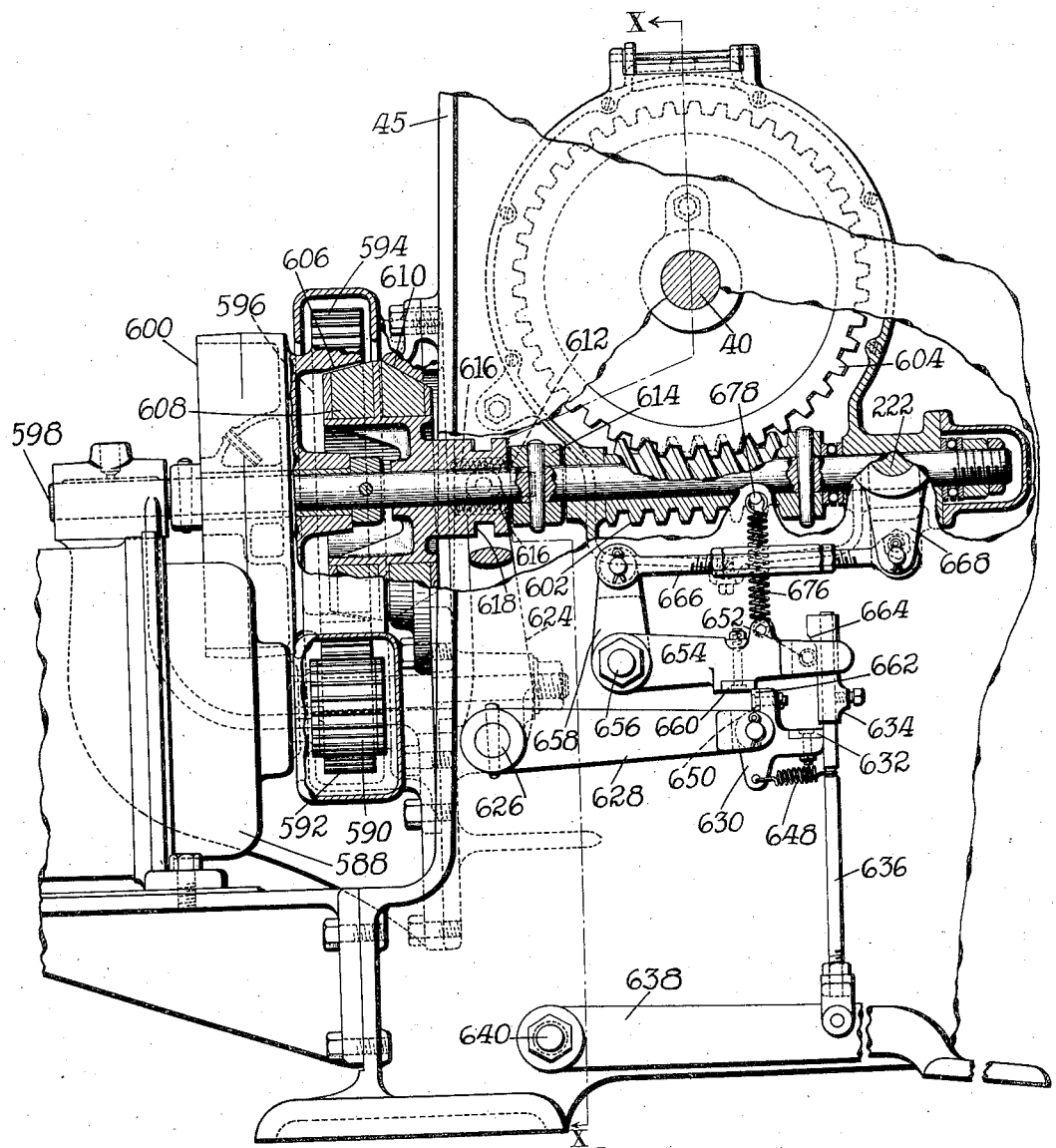
Fig. 9 shows the lower portion of the machine partly in left-hand side elevation and partly in section on an enlarged scale.
Figure 10:
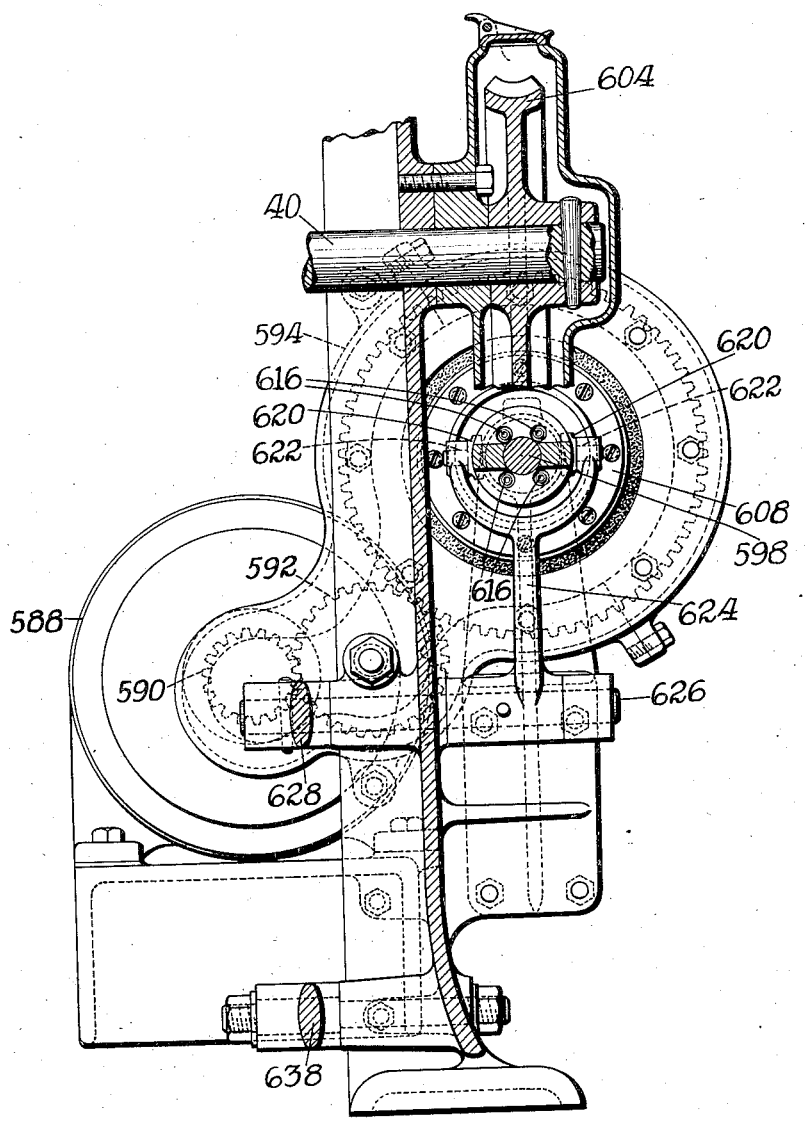
Fig. 10 is a section on the line X—X of Fig. 9.

When the operator depresses the starting treadle 638 the sleeve 634 acts on the plate 632 to tip the block 630 in such manner as to carry its plate 662 out from under the plate 660, thus tripping the clutch so that the springs 616 force the clutch member 608 into engagement with the clutch face 606 to start the operation of the machine. In further downward movement of the treadle the pin 652 acts on a cam face 664 on the sleeve 634 to swing the sleeve out from over the plate 632 and thus to permit the block 630 to be swung back to its former position by the spring 648. Such action of the block 630 is permitted by upward movement of the arm 654 which occurs immediately after the starting of the machine. The mechanism for controlling this arm comprises an adjustable link 666 whereby the previously mentioned arm 658 is connected to an arm 668 pinned to the shaft 222 to the outer end of which there is secured an arm 670 (Fig. 1). The arm 670 carries a roll 672 which is held in engagement with a cam 674, secured to the left-hand end of the shaft 49, by a spring 676 connected at one end to the arm 654 and at the other end to a pin 678 in the frame 45 (Figs. 2 and 9).

It will be understood that a downward movement is imparted to the arm 654 to release the clutch through the connections above-described by the action of the cam 674 on the arm 670.

When the machine is initially at rest, the wipers 24 and plates 28 are preferably so adjusted both lengthwise and widthwise of the shoe as to provide a small amount of clearance between their inner edge faces and the toe of the shoe and are located heightwise of the shoe a considerable distance above the bottom face of the insole $a$. The wipers 32 are located above the shoe in closed position, and the plates 36 are located just below the wipers and are preferably so adjusted both lengthwise and widthwise of the shoe as to prevent engagement of their inner edge faces with the lining as they are moved heightwise of the shoe with the wipers 32 to pull the upper.

In the use of the machine, the operator places a middle sole $b$ in which holes have been punched to receive the pins 60 on the plate 62, mounts a last with an upper and an insole assembled thereon on the pins 60, and then after inserting the margin of the lining between the wipers 24 and plates 28 and inserting the margin of the upper between the plates 36 and wipers 32, as indicated in Fig. 11, depresses the treadle 638 to start the operation of the machine. It will be understood that cement will have been previously applied to the margins of the upper and lining, and if desired also to the margins of the insole $a$ and sole $b$, around the toe ends and along the opposite sides of the toe ends of these parts before they are mounted on the positioning means as above described.

Figure 16:
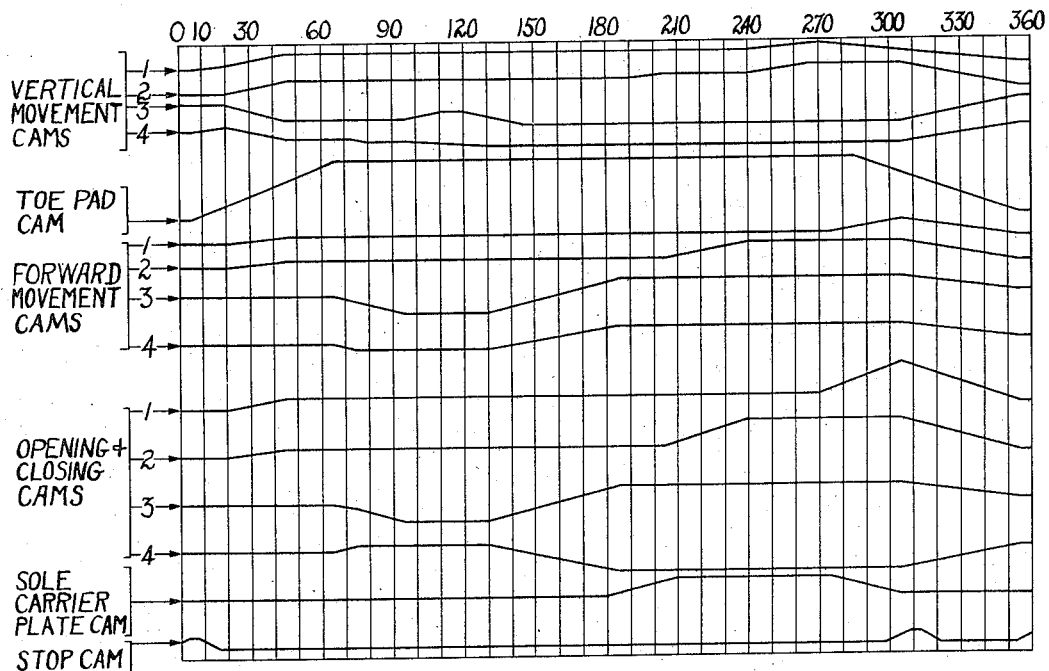
Fig. 16 is a diagram illustrating the relative timing of the cams which operate different parts of the machine.

The relative timing of the cams for operating the different wipers and clamping plates of the different sets is illustrated diagrammatically in Fig. 16, the numerals 1 and 2 referring respectively to the cams for operating the wipers 32 and the clamping plates 36 of the upper set and the numerals 3 and 4 referring respectively to the cams for operating the wipers 24 and the clamping plates 28 of the lower set.

At the beginning of the operation of the machine, the plates 28 which engage the marginal portion of the lining continuously around the end and along the sides of the end portion of the shoe are moved upwardly through the spring 316 to clamp the lining yieldingly against the bottom faces of the wipers 24 (Fig. 12) by the swinging of the lever 312 about its fulcrum 222. Thereafter the levers 312 and 220 are swung in unison in a direction to move the wipers 24 and plates 28 downwardly heightwise of the last toward the edge of the insole $a$ until the upper faces of the wipers 24 are located substantially in the plane of the bottom face of the insole. As the wipers 24 and plates 28 are thus moved downwardly the lining is pulled lengthwise of the last free from wrinkles and is drawn down tightly about the toe end of the last, the margin of the lining slipping relatively to the wipers and plates when the resistance to such movement caused by the clamping pressure of the wipers and plates on the lining is overcome by the force of the pull applied.

With the wipers 24 positioned as above described, they are advanced and closed (Fig. 13) to wipe the margin of the lining inwardly over the insole, and in order that the lining will be held under pulling strain until the wipers have been moved far enough inwardly over the insole to control the lining, the plates 28 receive partial advancing and closing movements with the wipers until the wipers have been moved inwardly over the edge of the shoe bottom. Thereafter the plates 28 are moved relatively to the wipers to release the margin of the lining as the wipers continue to move inwardly to wipe the margin of the lining over the insole. Substantially at the end of the inward movement of the wipers 24, the spring 242 is compressed, by the swinging of the lever 220, to increase the pressure of the wipers 24 on the overlaid margin of the lining and thus to force the lining into firm adherence to the insole, after which the lever 220 is swung in the opposite direction to relax the pressure of the wipers on the lining and to prevent displacement of the overlaid margin of the lining as the wipers 24 and plates 28 are thereafter fully retracted and opened.

Figure 12:
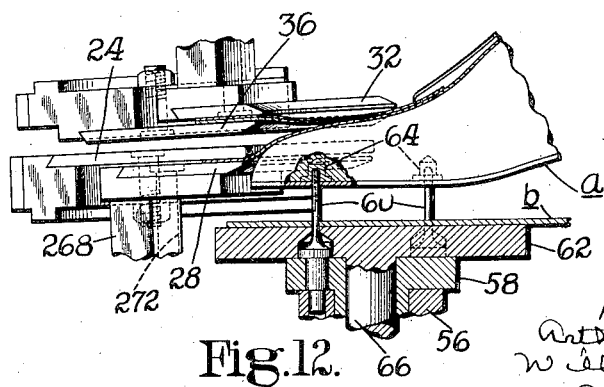
Figure 13:
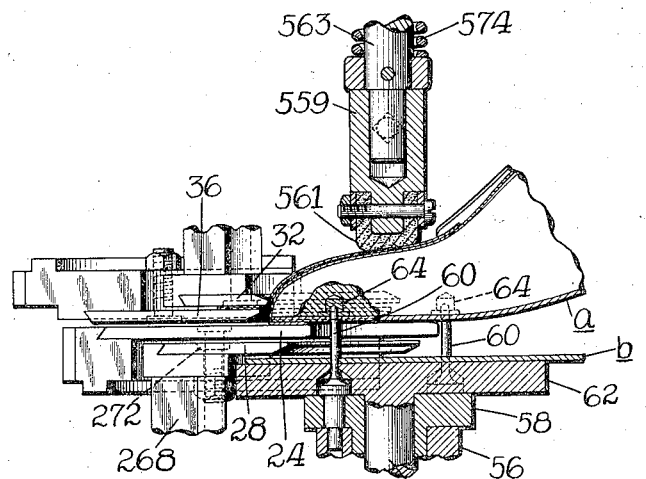
Figure 14:
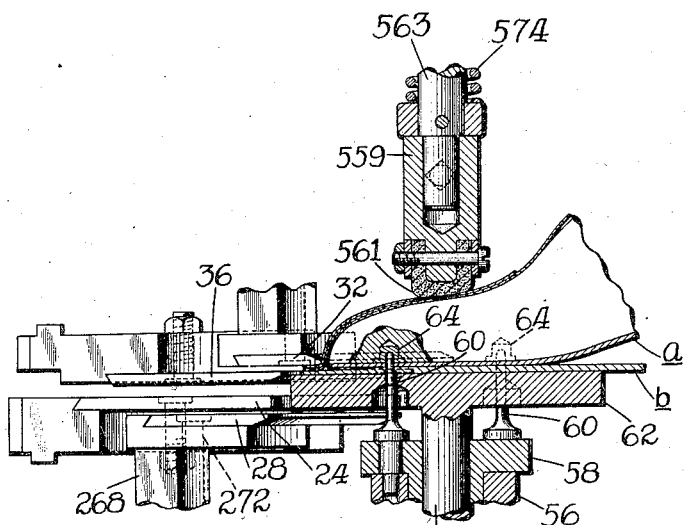

Substantially at the time in the operation of the machine when the plates 28 are moved upwardly to clamp the margin of the lining against the wipers 24, the wipers 32 are moved downwardly by the swinging of the lever 412 about its pivot 414 to press the margin of the upper continuously around the toe end and along the sides of the toe end portion of the last against the plates 36 (Fig. 12). It will be seen that the downward movement of the wipers 32 is effected through the heavy compression spring 418 so that as the wipers engage and press the margin of the upper the plates 36 will yield more or less, in response to such pressure, against the resistance of the light compression spring 458 which acts thereafter in the upper-pulling operation to hold the plates against the margin of the upper with sufficient clamping pressure to prevent slipping of the upper relatively to the wipers and plates until the desired tension has been applied to the upper. With the margin of the upper clamped between the wipers 32 and plates 36 the lever 454 is swung about the pivot 414 in time with the swinging of the lever 412 to impart to the plates 36 a downward movement heightwise of the last toward its bottom edge with the wipers to pull the upper. As the wipers 32 are moved heightwise of the shoe they are swung away from each other, against the resistance of the springs 488, by wedging action of the toe end of the shoe thereon and thus act to wipe the upper tightly and smoothly over the toe end of the last, the gear sectors 484 being swung in directions to permit the springs 488 to expand somewhat and the lever 344 being swung in a direction partially to retract the wipers as the wipers approach the edge of the insole in order to prevent undue pressure of the wipers on the upper. As the wipers 32 are swung away from each other and are partially retracted, the plates 36 are also swung away from each other and are partially retracted with the wipers by the swinging of the gear sectors 286 and the lever 264, after which the wipers 32 and plates 36 are brought to a stop substantially at the time when the wipers 24 and plates 28 have completed their heightwise movements and before they are moved inwardly over the insole to wipe the lining.

In the course of the movements of the different sets of wipers and clamps heightwise of the last to pull the lining and upper separately over the last, the toe pad 561 is moved into engagement with the shoe at the top of the forepart of the shoe to clamp the last against the upper ends of the pins 60 and to support the shoe against the upwardly directed pressure of the wipers 24 as they move inwardly to wipe the margin of the lining over the insole and press it into firm adherence to the insole, the toe rest 561 acting also to support the shoe against the pressure of the plate 62 as the plate is moved upwardly to apply the sole b to the bottom of the shoe in time relation to the operative movements of the wipers, as will now be described.

Near the end of the outward movements of the wipers 24 and plates 28 as previously described, the lever 90 is swung in a direction to impart upward movement to the sleeve 76 and the plate 62, and substantially at the same time the lever 454 is swung in a direction to move the plates 36 downward relatively to the wipers 32 to release the margin of the upper, after which the plates 36 are swung away from each other and are moved outwardly from over the plate 62 before the lever 90 has completed its swinging movement to impart to the plate 62 its movement toward the shoe to press the sole b against the overlaid margin of the lining. Near the end of the upward movement of the sleeve 76 the rods 106 are moved upwardly to permit the springs 120 and 122 to swing the pawls 100 into operative relation to the ratchet teeth on the member 102 to lock the plate 62 in position to support the projecting margin of the sole against the pressure of the wipers 32 with the sole in engagement with the overlaid margin of the lining.

As the plates 36 complete their outward movements, a further downward movement is imparted to the wipers 32 to press the outturned margin of the upper against the projecting margin of the sole, after which as the lever 412 continues to swing the spring 418 is compressed to apply heavy pressure to the materials between the wipers 32 and the plate 62. Thereafter the wipers 32 are elevated, the toe pad 560 is moved upwardly, the plate 62 is lowered and the machine is brought to a stop with the wipers and plates of each set fully retracted and opened to permit easy removal of the shoe from the machine by the operator, after which the machine is again started by depression of the treadle 638 and the wipers and plates are returned to their initial starting positions, whereupon the machine is again stopped by the action of the cam 674 on the arm 670.

Having described the invention, what we claim as new and desire to secure by Letters Patent of the United States is:

1. In a lasting machine, the combination with shoe-positioning means, of means for shaping different layers of shoe upper materials separately to a last while working on the different layers simultaneously and for working the marginal portion of each layer into finally lasted relation to a sole.

2. In a lasting machine, the combination with shoe-positioning means, of means for shaping different layers of shoe upper materials separately to a last while the different layers are assembled on the last, and power-operated mechanisms for imparting to said upper-shaping means movements relatively to the last to work the marginal portion of each layer of the upper materials into finally lasted relation to a sole.

3. In a lasting machine, the combination with shoe-positioning means, of means for shaping the lining portion of shoe upper materials to an end of a last and for wiping the marginal portion of the lining inwardly over an insole on the last, and means for lasting the upper over the lining.

4. In a lasting machine, the combination with shoe-positioning means, of means for clamping and pulling the lining portion of shoe upper materials to conform it tightly to the shape of an end of a last and for wiping the marginal portion of the lining inwardly over an insole on the last, and means for lasting the upper over the lining.

5. In a lasting machine, the combination with means for positioning a last and shoe upper materials, of means formed and arranged to clamp the marginal portions of different layers of the upper materials simultaneously around an end of the last and movable to tension the different layers separately and to draw them tightly over the end of the last.

6. In a lasting machine, the combination with means for positioning a last and shoe upper materials, of means formed and arranged to clamp the marginal portions of different layers of the upper materials around the toe end of the last, said means being movable heightwise of the last to effect a tensioning of the different layers separately lengthwise of the last and to draw them tightly over the end of the last.

7. In a lasting machine, the combination with shoe-positioning means, of means for shaping different layers of shoe upper materials separately to an end of a last, said means comprising different pairs of end-embracing wipers movable heightwise of the shoe, and a pair of plates associated with each pair of wipers, said different pairs of plates being arranged respectively to clamp the marginal portions of different layers of the shoe upper materials around the end of the last against the different wipers during their heightwise movements.

8. In a machine for shaping an end portion of a stitchdown shoe upper to its last, the combination with shoe-positioning means, of means for working different layers of the shoe upper materials separately over an end of the last and for laying the margin of one of the layers inwardly over an insole on the last and pressing the outturned margin of the other layer or layers against the projecting margin of a sole.

9. In a machine for shaping an end portion of a stitchdown shoe upper to its last, the combination with shoe-positioning means, of end-lasting means comprising different mechanisms for shaping different layers of the shoe upper materials separately to an end of the last and for laying the margin of one of the layers inwardly over an insole on the last and pressing the outturned flange of the other layer or layers against the projecting margin of a sole.

10. In a machine for shaping an end portion of a stitchdown shoe upper to its last, the combination with shoe-positioning means, of end-lasting means comprising different mechanisms for shaping different layers of the shoe upper materials separately to an end of the last and for laying the marginal portion of one of the layers inwardly over an insole on the last and for pressing the outturned flange of the other layer or layers against the projecting margin of a sole, and power-operated means for imparting to said different mechanisms their upper-shaping, overlaying and flange-pressing movements in predetermined time relation.

11. In a machine for lasting the toe end portions of stitchdown shoes, means for wiping the margin of the lining inwardly over an insole on the last, means for wiping the upper toward the bottom face of the last, and means arranged to cooperate with said last-named means to form an outturned flange on the upper.

12. In a machine for shaping an end portion of a stitchdown shoe upper to its last, the combination of means for shaping different layers of the upper materials separately to an end of the last, means for wiping the marginal portion of one of the layers inwardly over an insole on the last, and means for forming an outturned flange on the other layer or layers of the upper materials.

13. In a machine for shaping an end portion of stitchdown shoe upper materials over a last, the combination of means for pulling the upper and lining separately to shape them to an end of the last, means for wiping the margin of the lining inwardly over an insole on the last, and means for wiping the upper toward the bottom of the last and for pressing its outturned margin against the projecting margin of a sole.

14. In a machine for shaping the toe end portion of stitchdown shoe upper materials over a last, means for shaping the lining under tension to the toe end of the last and for laying its margin inwardly over an insole on the last, and means for pulling the upper and for wiping it toward the bottom edge of the last and for pressing the outturned margin of the upper against the projecting margin of a sole.

15. In a machine for shaping the toe end portion of stitchdown shoe upper materials over a last, means for pulling the lining lengthwise of the last and while holding it under tension laying its margin inwardly over an insole on the last, and means for pulling the upper and for wiping it toward the bottom edge of the last around the toe and for thereafter pressing the outturned margin of the upper against the projecting margin of a sole.

16. In a machine for shaping the toe end portion of stitchdown shoe upper materials over a last, toe-lasting means comprising a plurality of wipers arranged respectively to wipe the margin of the lining inwardly over an insole on the last and to press it firmly into adhering relation to the insole, and to wipe the upper toward the bottom edge of the last and press its outturned margin against the projecting margin of a sole.

17. In a machine for shaping the toe end portion of a stitchdown shoe upper to its last, toe-lasting means comprising a plurality of end-embracing wipers arranged respectively to wipe the marginal portion of one of the layers of the upper materials inwardly over an insole on a last, and to wipe the other layers of the upper materials toward the bottom edge of the last and press their outturned margins against the projecting margin of a sole.

18. In a machine for shaping the toe end portion of shoe upper materials over a last, toe-lasting means comprising end-embracing wipers mounted for movement heightwise of the last and also for bodily movements lengthwise of the last and swinging movements laterally of the last to wipe the margin of the lining inwardly over an insole on the last, means for clamping the margin of the lining against the wipers, and means for lasting the upper over the lining.

19. In a machine for shaping the toe end portion of shoe upper materials over a last, toe-lasting means comprising a pair of end-embracing wipers mounted for movement heightwise of a last and also for movements lengthwise and laterally of the last to wipe the margin of the lining inwardly over an insole on the last, a pair of plates mounted for movement heightwise of the last with the wipers and also for movements lengthwise and laterally of the last, said plates being constructed and arranged to clamp the marginal portion of the lining against the wipers, and means for lasting the upper over the lining.

20. In a machine for shaping the toe end portion of stitchdown shoe upper materials over a last, toe-lasting means comprising end-embracing wipers mounted for advancing movement lengthwise of the last and for closing movements laterally of the last to wipe the margin of the lining inwardly over an insole on the last, means for imparting to said wipers a movement heightwise of the last toward its bottom edge to position the wipers for the overwiping operation, means movable relatively to the wipers to clamp the margin of the lining against the wipers, and means for shaping the upper over the end of the last and for pressing the outturned margin of the upper against the projecting margin of a sole.

21. In a machine for shaping the toe end portion of stitchdown shoe upper materials over a last, toe-lasting means comprising end-embracing wipers mounted for movement heightwise of a last and also for movements lengthwise and laterally of the last to wipe the margin of the lining inwardly over an insole on the last, means for clamping the margin of the lining against the wipers to cause the lining to be drawn tightly over the end of the last during the movement of the wipers heightwise of the last, said clamping means being movable to release the lining after the wipers have begun to wipe the lining inwardly over the edge of the insole, and means for shaping the other layer or layers of the upper materials over the end of the last and for pressing their outturned margin against the projecting margin of a sole.

22. In a machine for shaping the toe end portion of stitchdown shoe upper materials over a last, toe-lasting means comprising end-embracing wipers mounted for movement heightwise of a last and also for advancing movement lengthwise of the last and closing movements laterally of the last to wipe the margin of the lining inwardly over an insole on the last, means for clamping the margin of the lining continuously around the end and along the sides of the toe portion of the last against the wipers, means for withdrawing the clamping means after the wipers have begun to move inwardly over the edge of the insole, and means for wiping the upper over the end of the last toward its bottom edge and for pressing the outturned margin of the upper against the projecting margin of a sole.

23. In a machine for shaping the toe end portion of stitchdown shoe upper materials over a last, toe-lasting means comprising end-embracing wipers mounted for bodily movement lengthwise of a last and for swinging movements laterally of the last to wipe the margin of the lining inwardly over an insole on the last, means for imparting to said wipers a movement heightwise of the last toward its bottom edge to position the wipers for the overwiping operation, means to engage the lining around the end and along the sides of the toe portion of the last, said means being constructed and arranged to cooperate with the wipers to clamp the lining, means for withdrawing said clamping means at a predetermined time in the movement of the wipers inwardly over the insole, and means for wiping the upper over the end of the last toward its bottom edge and for pressing the outturned margin of the upper against the projecting margin of a sole.

24. In a machine for shaping the toe end portion of stitchdown shoe upper materials over a last, the combination with means for positioning a last and its shoe materials, of toe-lasting means comprising a plurality of wipers arranged respectively to wipe the margin of the lining inwardly over an insole and to wipe the upper heightwise of the last toward the bottom edge of the last and press its outturned flange against the projecting margin of a sole, and means for imparting to said wipers their operative movements in automatically predetermined sequence.

25. In a machine for shaping an end portion of an upper to its last, the combination with shoe-positioning means, of a pair of end-embracing wipers, a pair of plates for engaging the margin of the upper continuously around the end and along the sides of the end portion of the shoe, means for effecting relative movement of said wipers and the shoe heightwise of the shoe to effect shaping of the upper over the end of its last, said wipers being arranged to engage and press the margin of the upper against the plates during said relative heightwise movement, power-operated means for effecting relative movement of said plates and the shoe heightwise of the shoe with the wipers, and connections between said power-operated means and the plates including a spring arranged to be tensioned in response to pressure of the wipers on the margin of the upper.

26. In a machine for shaping an end portion of an upper to its last, the combination with means for positioning a last and shoe upper materials, of end-embracing wipers movable heightwise of the shoe to wipe the upper toward the bottom edge of the last, plates for engaging the margin of the upper at the end and along the sides of the end portion of the last, said plates being movable toward the bottom edge of the last in response to pressure of the wipers on the margin of the upper, spring means arranged to be tensioned by the movement of the plates with the wipers to increase the pressure of the plates on the upper, and means for thereafter moving the plates toward the bottom edge of the last with the wipers without varying the tension of said spring means.

27. In a machine for shaping an end portion of an upper to its last, the combination with means for positioning a last and shoe upper materials with the last bottom downward, of a support above said positioning means, end-embracing wipers carried by said support, means for moving the wipers relatively to the positioning means heightwise of the last to cause the wipers to wipe the upper toward the bottom edge of the last, plates below said wipers arranged to engage the margin of the upper around the end and along the sides of the end portion of the last, said plates being movable toward the bottom edge of the last in response to pressure of the wipers on the margin of the upper, spring means for opposing the movement of the plates with the wipers, and additional means for imparting to the plates a movement heightwise of the last with the wipers without relaxing the pressure of the plates on the margin of the upper.

28. In a machine for shaping an end portion of an upper to its last, the combination with means for positioning a last and shoe upper materials, of a pair of end-embracing wipers movable heightwise of the last to wipe the upper toward the bottom edge of the last, a pair of plates for engaging the margin of the upper continuously around the end and along the sides of the end portion of the last, said plates being movable toward the bottom edge of the last in response to pressure of the wipers on the margin of the upper, spring means for opposing the movement of the plates with the wipers to cause the plates to clamp the upper yieldingly against the wipers, and additional means for imparting to the plates a movement heightwise of the shoe with the wipers to pull the upper while maintaining the plates in clamping engagement with the upper.

29. In a machine for shaping an end portion of an upper to its last, the combination with means for positioning a last and shoe upper materials, of end-embracing wipers, plates for embracing the end of the shoe and arranged to engage the margin of the upper around the end and along the sides of the end portion of the shoe, wiper-operating mechanism constructed to press the wipers yieldingly against the shoe and to move the wipers heightwise of the shoe to wipe the upper toward the bottom edge of the last, spring means for opposing movement of the plates with the wipers to cause the plates to clamp the margin of the upper yieldingly against the wipers, and means acting independently of said spring means for moving the plates with the wipers heightwise of the shoe to pull the upper.

30. In a machine for shaping an end portion of an upper to its last, the combination with means for positioning a last and shoe upper materials, of end-embracing wipers movable heightwise of the last to wipe the upper toward the bottom edge of the last, plates for engaging the margin of the upper continuously around the end and along the sides of the end portion of the last, said plates being movable toward the bottom edge of the last in response to such movement of the wipers, spring means for opposing the movement of the plates with the wipers to cause the plates to clamp the margin of the upper yieldingly against the wipers, means for adjusting the tension of said spring means, and means acting independently of said spring means for moving the plates with the wipers to pull the upper.

31. In a machine for shaping an end portion of a stitchdown shoe upper to its last, the combination with means for positioning a last and shoe upper materials, of end-embracing wipers movable heightwise of the last to wipe the upper toward the bottom edge of the last, plates for engaging the margin of the upper continuously around the end and along the sides of the end portion of the last, said plates being movable toward the bottom edge of the last in response to pressure of the wipers on the margin of the upper, spring means for opposing the movement of the plates with the wipers to cause the plates to clamp the upper yieldingly against the bottom face of the wipers, means for moving the plates toward the bottom edge of the last with the wipers without varying the tension of said spring means, and means for withdrawing the plates to permit the wipers to press the outturned margin of the upper against the projecting margin of an extension sole.

32. In a machine for shaping an end portion of a stitchdown shoe upper to its last, means for positioning a last and its shoe materials including a member for supporting the projecting margin of an extension sole, a wiper support above said positioning means, a pair of end-embracing wipers on said support, cam-controlled means for moving said wiper support heightwise of the shoe to cause the wipers to wipe the upper toward the bottom edge of the last, a pair of plates arranged to engage the margin of the upper around the end and along the sides of the end portion of the last, a carrier for said plates, a spring for upholding said carrier and for opposing movement of the plates with the wipers to cause the plates to clamp the upper yieldingly against the bottom face of the wipers, and automatic means for imparting to the plates a movement heightwise of the last with the wipers to pull the upper and for withdrawing the plates at a predetermined time in the heightwise movement of the wipers to permit the wipers to press the outturned margin of the upper against the projecting margin of the extension sole.

33. In a machine for shaping an end portion of a stitchdown shoe upper to its last, the combination with shoe-positioning means, of end-embracing wipers movable heightwise of the shoe for wiping the upper toward the bottom edge of the shoe, and means constructed and arranged to clamp the margin of the upper around the end and along the sides of the end portion of the shoe against the wipers during a portion of the movement of the wipers heightwise of the shoe and to withdraw to permit the wipers to press the margin of the upper against the projecting margin of an extension sole.

34. In a machine for shaping an end portion of a stitchdown shoe upper to its last, the combination with shoe-positioning means, of end-embracing wipers movable heightwise of the shoe for wiping the upper toward the bottom edge of the shoe and for pressing the outturned margin of the upper against the projecting margin of a sole, means constructed and arranged to cooperate with the wipers to clamp the margin of the upper around the end and along the sides of the end portion of the shoe, and means for operating the clamping means to release the upper before its margin is pressed against the sole by the wipers.

35. In a machine for shaping an end portion of a stitchdown shoe upper to its last, the combination with shoe-positioning means, of end-embracing wipers movable heightwise of the shoe for wiping the upper toward the bottom edge of the shoe, means arranged to cooperate with the wipers to clamp the margin of the upper continuously around the end and along the sides of the end portion of the shoe, and means operating in time relation to the movement of the wipers for withdrawing the clamping means to permit the wipers to press the outturned margin of the upper against the projecting margin of an extension sole.

36. In a machine for shaping an end portion of a stitchdown shoe upper to its last, the combination with shoe-positioning means, of end-embracing wipers movable heightwise of the shoe for wiping the upper toward the bottom edge of the shoe, means arranged to cooperate with the wipers to clamp the margin of the upper continuously around the end and along the sides of the end portion of the shoe, means for withdrawing the clamping means to permit the wipers to press the outturned margin of the upper against the projecting margin of an extension sole, and means for increasing the pressure of the wipers on the outturned margin of the upper.

37. In a machine for shaping an end portion of a stitchdown shoe upper to its last, means for positioning a last and its shoe materials including a member for supporting the projecting margin of an extension sole, a wiper support above said shoe-positioning means, a pair of end-embracing wipers on said support, power-operated means for moving the wiper support and the wipers heightwise of the last to cause the wipers to wipe the upper toward the bottom edge of the last, a pair of plates below said wipers arranged to engage the margin of the upper around the end of the last, a carrier for said plates, a spring for upholding said carrier and for opposing movement of the plates with the wipers to cause the plates to clamp the upper yieldingly against the bottom face of the wipers, power-operated means for imparting to said plates in time relation to the movement of the wipers a movement heightwise of the shoe with the wipers to pull the upper, and power-operated means for withdrawing the plates at a predetermined time in the movement of the wipers heightwise of the shoe to permit the wipers to press the outturned margin of the upper against the projecting margin of the extension sole.

38. In a machine for shaping the toe end portion of stitchdown shoe upper materials over a last, the combination with means for positioning a last and its shoe materials, of toe-lasting means comprising a set of wipers and plates mounted for movements relatively to each other and to the last to clamp and pull the lining to shape it to the toe end of the last and then to wipe the marginal portion of the lining inwardly over an insole on the last, a second set of wipers and plates mounted for movements relatively to each other and to the last to clamp and pull the upper over the lining and to wipe it toward the bottom edge of the last, means to withdraw said last-named plates at a predetermined time in the upper-pulling movement to permit said second wipers to press the outturned margin of the upper against the projecting margin of a sole, and separate power-operated mechanisms for operating said different sets of wipers and plates in time relation to each other.

39. In a machine for shaping the toe end portion of shoe upper materials over a last, toe-lasting means comprising a plurality of wipers movable heightwise of the last toward its bottom edge and arranged respectively to shape the lining over the end of the last and to wipe the upper toward the bottom edge of the last, and a plurality of devices arranged respectively to engage the marginal portions of the lining and upper and to cooperate with the different respective wipers to clamp and pull the lining and upper separately over the end of the last in the movements of the wipers heightwise of the last.

40. In a machine for shaping the toe end portion of shoe upper materials over a last, toe-lasting means comprising a plurality of end-embracing wipers movable heightwise of the last toward its bottom edge and arranged respectively to shape the lining over the end of the last and to wipe the upper toward the bottom edge of the last, and a plurality of plates arranged respectively to engage the marginal portions of the lining and upper around the end and along the sides of the end portion of the last and to clamp the lining and upper against their different respective wipers in the movements of the wipers heightwise of the last.

41. In a machine for shaping the toe end portion of stitchdown shoe upper materials over a last, toe-lasting means comprising different wipers arranged respectively to shape the lining over the end of the last and wipe its margin inwardly over an insole on the last and to wipe the upper toward the bottom edge of the last, automatic means for imparting to said lining wipers a movement heightwise of the last and then movements lengthwise and laterally of the last to overwipe the margin of the lining, said means being constructed and arranged thereafter to impart to the lining wipers at the completion of their overwiping movements a movement outwardly into an inoperative position, and automatic means for imparting to said upper wipers a movement heightwise of the last with said lining wipers and for momentarily suspending the operation of said upper wipers until after the lining wipers have completed their overwiping movements and have been moved outwardly, said last-named means being constructed and arranged thereafter to impart to said upper wipers a further movement heightwise of the last to cause said wipers to press the outturned margin of the upper against the projecting margin of a sole.

42. In a machine for shaping the toe end portion of stitchdown shoe upper materials over a last, toe-lasting means comprising different wipers arranged respectively to shape the lining over the end of the last and to wipe its margin inwardly over an insole on the last and to wipe the upper toward the bottom edge of the last, power-operated means for imparting to said lining wipers a movement heightwise of the last to shape the lining and to position said wipers for the overwiping operation, power-operated means for imparting to said lining wipers their overwiping movements and for thereafter moving them outwardly, and power-operated means for imparting to said upper wipers a movement heightwise of the last with said lining wipers and for momentarily suspending the operation of the upper wipers until after the lining wipers have completed their overwiping movements and have been moved outwardly, said last-named means being arranged thereafter to impart to said upper wipers a further movement heightwise of the last to cause said wipers to press the outturned margin of the upper against the projecting margin of a sole.

43. In a machine for shaping an end portion of a stitchdown shoe upper to its last, the combination with shoe-positioning means, of end-embracing means movable heightwise of a shoe on said positioning means for shaping an end of the shoe upper to its last and for pressing the outturned margin of the upper against the projecting margin of an extension sole, and means movable relatively to said end-embracing means for applying a sole to the shoe and for supporting its projecting margin against the pressure of said end-embracing means.

44. In a machine for shaping an end portion of a stitchdown shoe upper to its last, the combination with shoe-positioning means, of end-embracing means movable heightwise of a shoe on said positioning means for shaping an end of the shoe upper to its last and for pressing the outturned margin of the upper against the projecting margin of an extension sole, and means movable to apply a sole to the shoe and arranged to support the sole against the pressure of the end-embracing means.

45. In a machine for shaping an end portion of a stitchdown shoe upper to its last, the combination with shoe-positioning means, of end-embracing wipers movable heightwise of a shoe on said positioning means for shaping an end of the shoe upper to its last and for pressing the outturned margin of the upper against the projecting margin of an extension sole, and a member movable toward the shoe to position the sole for the operation of the wipers, said member being arranged to support the sole including its projecting margin against the pressure of the wipers.

46. In a machine for shaping an end portion of a stitchdown shoe upper to its last, the combination with shoe-positioning means, of end-embracing wipers movable heightwise of a shoe on said positioning means for shaping an end of the shoe upper to its last and for pressing the outturned margin of the upper against the projecting margin of an extension sole, a member for first pressing a sole yieldingly against the bottom face of the shoe and for supporting the projecting margin of the sole against the pressure of the wipers, and means for locking said member in sole-supporting position.

47. In a machine for shaping an end portion of a stitchdown shoe upper to its last, the combination with shoe-positioning means, of end-embracing wipers movable heightwise of a shoe on said shoe-positioning means for wiping the upper toward the bottom edge of the shoe and for pressing the outturned margin of the upper against the projecting margin of a sole, a member formed and arranged to support an extension sole including its projecting margin initially at a substantial distance from the bottom face of the shoe, and means for imparting to said member in time relation to the movement of the wipers a movement relatively to said positioning means to carry the sole toward the shoe and to press it against the bottom face of the shoe.

48. In a machine for shaping the toe end of stitchdown shoe upper materials over a last, means for positioning a last having thereon an insole and upper materials including a lining and for positioning an unattached extension sole in predetermined relation to the last, toe-lasting means comprising wipers for wiping the margin of the lining inwardly over the insole, wipers for wiping the upper toward the bottom edge of the last and for pressing the outturned margin of the upper against the projecting margin of the sole, and mechanism for moving the unattached sole on said positioning means relatively to the last and for pressing it upon the overlaid margin of the lining.

49. In a machine for shaping the toe end of stitchdown shoe upper materials over a last means for positioning a last having thereon an insole and upper materials including a lining and for positioning an unattached extension sole in predetermined relation to the last, toe-lasting means comprising wipers for wiping the margin of the lining inwardly over the insole, wipers for wiping the upper toward the bottom edge of the last and for pressing the outturned margin of the upper against the projecting margin of the sole, separate power-operated mechanisms for operating the different respective wipers in time relation to each other, and mechanism for moving the unattached sole on said positioning means relatively to the last and for pressing it upon the overlaid margin of the lining in time relation to the operative movements of the wipers.

50. In a machine for shaping the toe end portion of stitchdown shoe upper materials over a last, toe-lasting means comprising a plurality of wipers arranged respectively to wipe the margin of the lining inwardly of an insole on the last and to wipe the upper toward the bottom edge of the last and press its outturned flange against the projecting margin of a sole, means for positioning the last and its shoe materials relatively to said toe-lasting means, said positioning means being constructed and arranged also to engage and position an unattached extension sole in predetermined relation to the last, and means constructed to operate in time relation to the operative movements of the wipers for applying the sole on said positioning means to the shoe and for supporting its projecting margin during the flange-pressing operation.

51. In a machine for shaping the toe end portion of stitchdown shoe upper materials over a last, toe-lasting means comprising a plurality of wipers arranged respectively to wipe the margin of the lining inwardly over an insole on the last and to wipe the upper toward the bottom edge of the last and press its outturned flange against the projecting margin of a sole, separate power-operated mechanisms for imparting to the different wipers their operative movements, shoe-positioning means for supporting the last and its shoe materials relatively to said toe-lasting means, and a member movable relatively to said positioning means in time relation to the operative movements of the wipers for applying an extension sole to the shoe and for supporting its projecting margin during the flange-pressing operation.

52. In a machine for shaping an end portion of a stitchdown shoe upper to its last, means for shaping the lining and upper separately to an end of the last, means for wiping the marginal portion of the lining inwardly over an insole on the last, means for pressing the outturned flange of the upper against the projecting margin of an extension sole, and means for positioning the last and its upper materials in predetermined relation to said upper shaping means and said overwiping means and for also positioning an extension sole relatively to said flange-pressing means.

53. In a machine for shaping an end portion of a stitchdown shoe upper to its last, means for shaping the lining and upper separately to an end of the last, means for wiping the marginal portion of the lining inwardly over an insole on the last, means for pressing the outturned flange of the upper against the projecting margin of an extension sole, and shoe-positioning means comprising a plurality of pins arranged to enter holes in the bottom of the forepart of the last to position the last and its shoe materials relatively to said upper shaping means and said overwiping means, said pins being arranged also to extend through holes in the forepart of an extension sole to position the sole relatively to said flange-pressing means.

54. In a machine for shaping the toe end portion of stitchdown shoe upper materials over a last, toe-lasting means comprising different wipers arranged respectively to wipe the margin of the lining inwardly over an insole on the last and to wipe the upper toward the bottom edge of the last and press its outturned flange against the projecting margin of an extension sole, shoe-positioning means comprising a plurality of pins mounted in predetermined relation to said wipers and arranged to enter holes in the bottom of the forepart of the last to position the last and its shoe materials relatively to the wipers, said pins being arranged also to extend through holes in the forepart of an unattached extension sole to position the sole in predetermined relation to the last, and means constructed to operate in time relation to the operative movements of the wipers for pressing the sole upon the overlaid margin of the lining and for supporting its projecting margin during the flange-pressing operation.

55. In a machine for shaping an end portion of a stitchdown shoe upper to its last, the combination with shoe-positioning means, of end-embracing wipers movable heightwise of a shoe on said positioning means for wiping the upper toward the bottom edge of the shoe and for pressing the outturned margin of the upper against the projecting margin of an extension sole, means arranged to cooperate with the wipers to clamp the margin of the upper during a portion of the movement of the wipers heightwise of the shoe and then to release the upper to permit the wipers to press the outturned margin of the upper against the sole, and means for supporting an unattached extension sole in an out of the way position during the movements of the wipers and clamping means heightwise of the shoe and for moving the sole into engagement with the bottom face of the shoe after the margin of the upper has been released by said clamping means.

56. In a machine for shaping an end portion of a stitchdown shoe upper to its last, the combination with shoe-positioning means, of end-embracing wipers movable heightwise of a shoe on said positioning means for wiping the upper toward the bottom edge of the shoe and for pressing the outturned flange of the upper against the projecting margin of an extension sole, a pair of plates for engaging the margin of the upper around the end and along the sides of the end portion of the shoe, said plates being arranged to clamp the upper against the wipers, means constructed to operate in time relation to the movement of the wipers for withdrawing said plates, and means arranged to support an unattached extension sole initially out of engagement with the bottom face of the shoe, said means being constructed to apply the sole to the bottom of the shoe after the clamping plates have been withdrawn and to support the sole including its projecting margin during the flange-pressing operation.

57. In a machine for shaping an end portion of a stitchdown shoe upper to its last, the combination with shoe-positioning means, of end-embracing wipers mounted for movement heightwise of a shoe on said positioning means to wipe the upper toward the bottom edge of the shoe and to press the outturned margin of the upper against the projecting margin of an extension sole, means arranged to cooperate with the wipers to clamp the upper during a portion of the movement of the wipers heightwise of the shoe and then to release the upper and to move outwardly out of the path of the wipers, and means for supporting an unattached extension sole initially in spaced relation to the bottom face of the shoe and for applying the sole to the bottom of the shoe after the clamping means has been moved outwardly, said last-named means being formed and arranged to support the projecting margin of the sole against the pressure of the wipers.

58. In a machine for shaping an end portion of a stitchdown shoe upper to its last, the combination with shoe-positioning means, of a pair of end-embracing wipers, means for moving the wipers heightwise of a shoe on said shoe-positioning means to shape the upper over the end of its last, a pair of plates arranged to cooperate with the wipers to clamp the upper during a portion of the movement of the wipers heightwise of the shoe and then to release the upper and to move outwardly, means for supporting an unattached extension sole below the shoe-positioning means, and means for moving the sole-supporting means upwardly to press the sole upon the bottom face of the shoe after the upper has been released by said plates to permit the wipers to press the outturned margin of the upper against the projecting margin of the sole.

59. In a machine for shaping an end portion of a stitchdown shoe upper to its last, the combination with shoe-positioning means, of end-embracing wipers mounted for movement heightwise of a shoe on said supporting means to wipe the upper toward the bottom edge of the shoe, a pair of plates arranged to engage the margin of the upper continuously around the end and along the sides of the end portion of the shoe and to cooperate with the wipers to clamp the upper during a portion of the movement of the wipers heightwise of the shoe and then to release the upper and to move outwardly, a member for supporting an unattached extension sole initially a predetermined distance below the bottom face of the shoe, said member being movable toward the shoe in time relation to the outward movement of the plates to press the sole upon the bottom face of the shoe, and means for imparting to the wipers their movement heightwise of the shoe to wipe the upper, said means being constructed and arranged to impart to the wipers a further movement in the same direction to cause the wipers to press the outturned margin of the upper against the projecting margin of the sole after the sole has been pressed against the bottom of the shoe by said sole-supporting member.

60. In a machine for shaping an end portion of a stitchdown shoe upper to its last, the combination with shoe-positioning means, of end-embracing wipers mounted for movement heightwise of a shoe on said positioning means, a pair of plates arranged to engage the margin of the upper continuously around the end and along the sides of the end portion of the shoe and to cooperate with the wipers to clamp the upper during a portion of the movement of the wipers heightwise of the shoe, means for withdrawing the plates in predetermined time relation to the movement of the wipers heightwise of the shoe, a member for supporting an unattached extension sole initially a predetermined distance below the bottom face of the shoe, means for moving said member toward the shoe to press the sole upon the bottom face of the shoe after the plates have been withdrawn, and means for imparting to said wipers a movement heightwise of the shoe to cause the wipers to wipe the upper toward the bottom of the shoe and to press the outturned margin of the upper against the projecting margin of the sole on said supporting member, said means being constructed thereafter to apply heavy pressure to the outturned margin of the upper and the projecting margin of the sole.

61. In a machine for shaping the toe end portion of stitchdown shoe upper materials over a last, toe-lasting means comprising different wipers arranged respectively to wipe the margin of the lining inwardly over an insole on the last and to wipe the upper toward the bottom edge of the last and press its outturned flange against the projecting margin of an extension sole, shoe-positioning means comprising a plurality of pins mounted in predetermined relation to said wipers and arranged to enter holes in the bottom of the forepart of the last to position the last and its shoe materials relatively to the wipers, said pins being arranged also to extend through holes in the forepart of an unattached extension sole to position the sole in predetermined relation to the last, a plate movable relatively to said pins for supporting the unattached sole initially below the bottom face of the shoe, and means constructed to operate in time relation to the operative movements of the wipers for moving the plate toward the shoe into position to support the sole including its projecting margin during the flange-pressing operation with the sole in engagement with the overlaid margin of the lining.

62. In a machine for shaping an end portion of a stitchdown shoe upper to its last, the combination with the shoe-positioning means, of a wiper support above said shoe-positioning means, a pair of end-embracing wipers on said support, cam-controlled means for moving said wiper support heightwise of the shoe to cause the wipers to wipe the upper toward the bottom face of the shoe and to press the outturned margin of the upper against the projecting margin of an extension sole, a pair of plates arranged to engage the margin of the upper continuously around the end and along the sides of the end portion of the shoe, a carrier for said plates, a spring for upholding said carrier and for opposing movement of the plates with the wipers to cause the plates to clamp the margin of the upper yieldingly against the bottom face of the wipers, means for moving the plates with the wipers during a portion of the movement of the wipers heightwise of the shoe and for thereafter moving the plates relatively to the wipers into an inoperative position, a member for supporting an extension sole including its projecting margin initially a predetermined distance below the bottom face of the shoe, means constructed to operate in time relation to the movements of the wipers and plates for moving said member upwardly into position to support the sole against the pressure of the wipers with the sole in engagement with the bottom face of the shoe, means for locking said member in said position, and a heavy spring arranged to be tensioned by said cam-controlled means in response to resistance of said sole-supporting member to further heightwise movement of said wipers to cause heavy pressure to be applied to the materials between the wipers and said member.

ARTHUR F. PYM.
WILLIAM E. SCARLETT.